United States Patent [19]
Luria

[11] Patent Number: 6,059,229
[45] Date of Patent: May 9, 2000

[54] COMPACT STORING AND RETRIEVING APPARATUS PARTICULARLY USEFUL FOR AIRCRAFT

[75] Inventor: David Luria, Tel Aviv, Israel

[73] Assignee: Fuselage Engineering Services, Ltd., Tel Aviv, Israel

[21] Appl. No.: 09/038,062

[22] Filed: Mar. 11, 1998

Related U.S. Application Data

[63] Continuation-in-part of application No. 08/692,995, Aug. 6, 1996, abandoned.

[51] Int. Cl.⁷ ...................................................... E04H 6/06
[52] U.S. Cl. .................................... 244/118.1; 198/465.1; 198/465.2; 414/237
[58] Field of Search ........................... 198/463.1, 465.1, 198/465.2; 244/1 R, 118.1, 129.1, 137.1; 414/236, 237

[56] References Cited

U.S. PATENT DOCUMENTS

| | | | |
|---|---|---|---|
| 3,221,781 | 12/1965 | Forsstrom | 198/465.2 |
| 3,662,905 | 5/1972 | Mizuno et al. | 414/237 |
| 3,809,208 | 5/1974 | Shields | 198/465.2 |
| 4,040,533 | 8/1977 | DeBoer et al. | 198/465.2 |
| 5,074,496 | 12/1991 | Rezag et al. | 244/118.1 |
| 5,205,515 | 4/1993 | Luria | 244/118.1 |
| 5,314,143 | 5/1994 | Luria | 244/118.1 |
| 5,322,244 | 6/1994 | Dallmann et al. | 244/118.1 |
| 5,413,292 | 5/1995 | Luria | 244/118.1 |
| 5,496,000 | 3/1996 | Mueller | 244/118.1 |

*Primary Examiner*—Peter M. Poon
*Assistant Examiner*—Charles R Ducker, Jr.

[57] ABSTRACT

Apparatus for compactly storing and retrieving a plurality of movable devices of the same size and external configuration, particularly containers in an aircraft, includes a support for horizontally supporting the movable devices in the form of a two-dimensional matrix constituted of two columns and a plurality of rows of two devices in each row, with a vacant space for one device in each of the first and last rows of the matrix. The apparatus further includes longitudinal and transverse transfer assemblies for shifting the devices to permit them to be selectively stored or retrieved, and retainer members engageable with the outer faces of the devices for securing them against movement at all times except during an actual storing or retrieving operation.

37 Claims, 26 Drawing Sheets

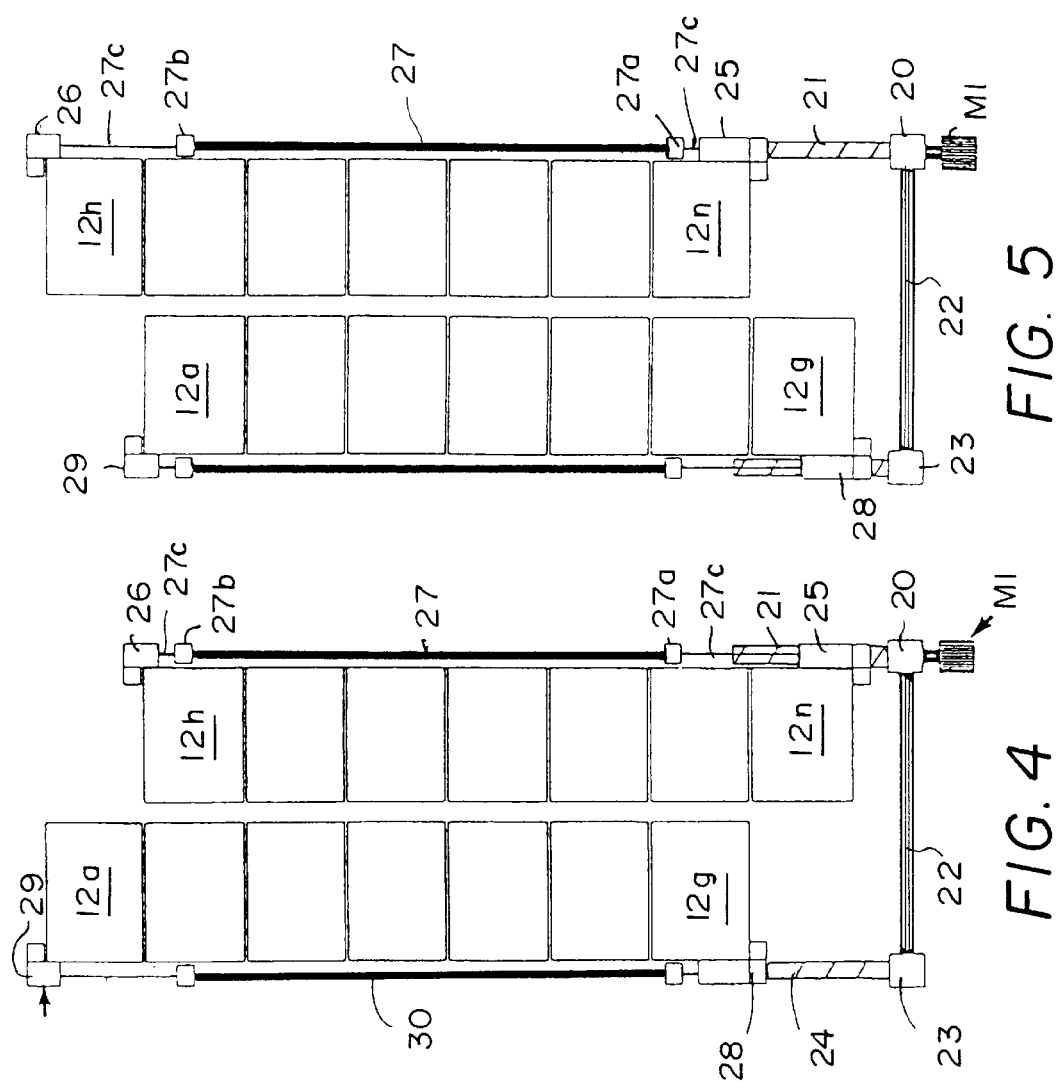

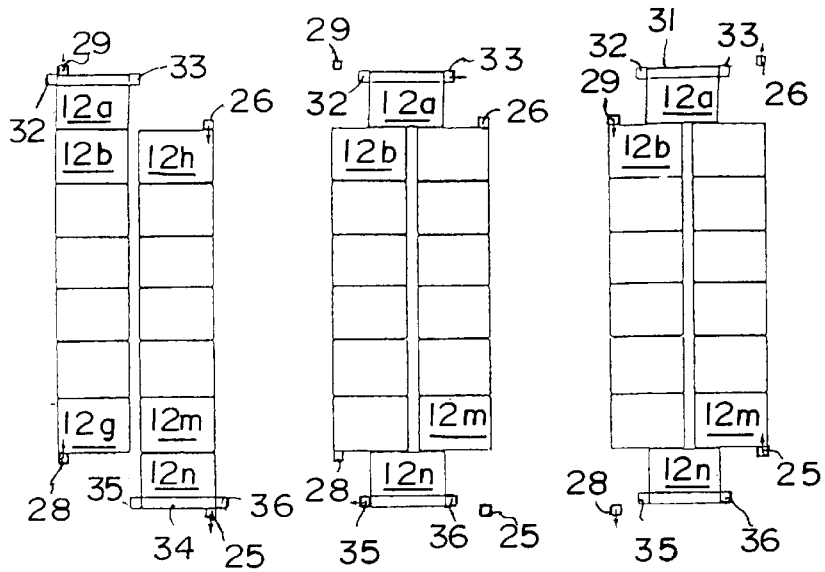
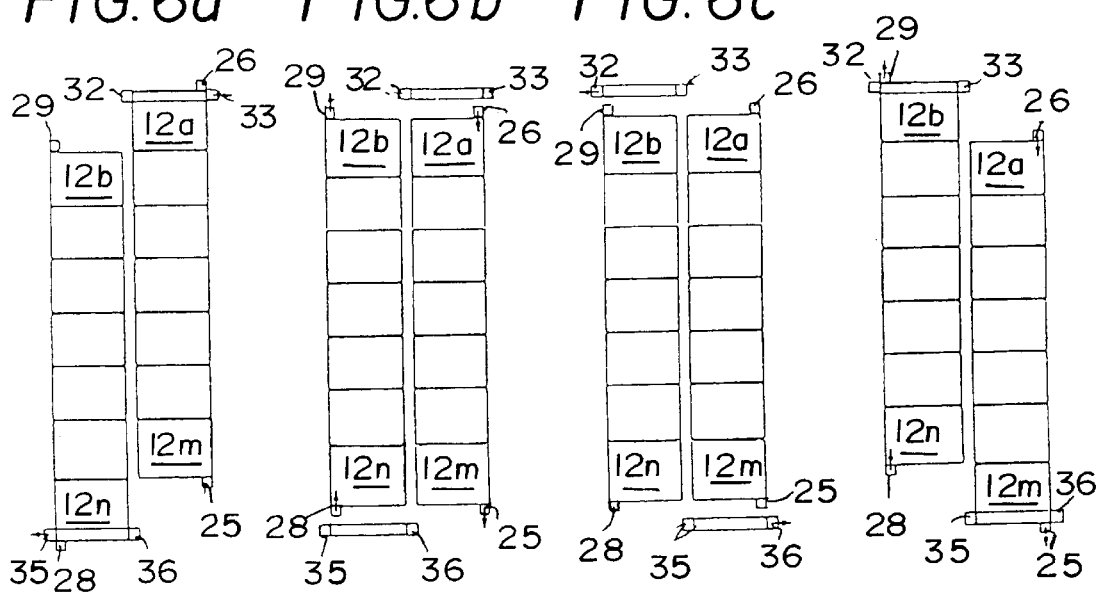
FIG. 6a  FIG. 6b  FIG. 6c
FIG. 6d  FIG. 6e  FIG. 6f  FIG. 6g

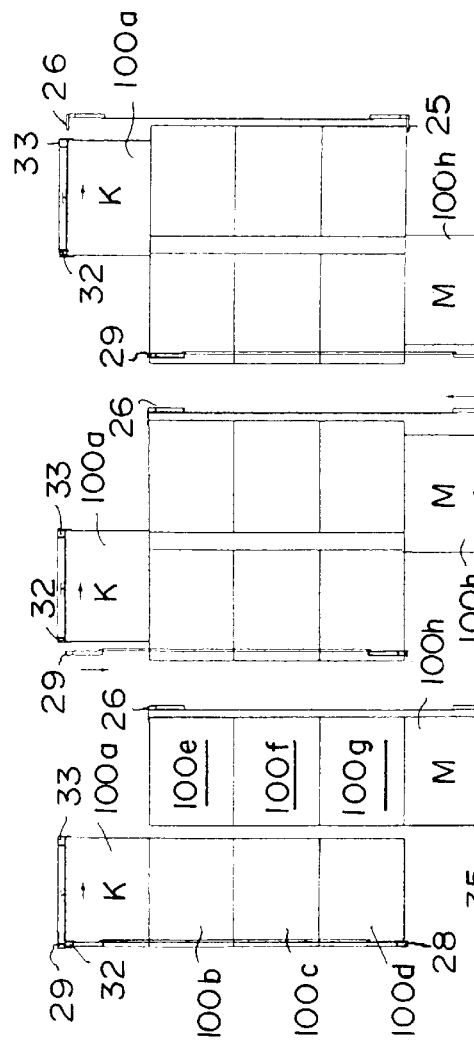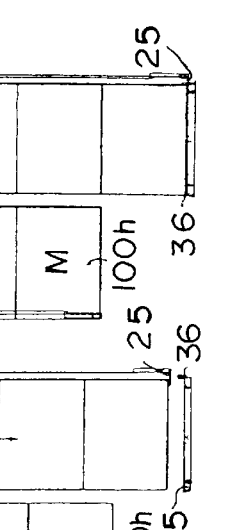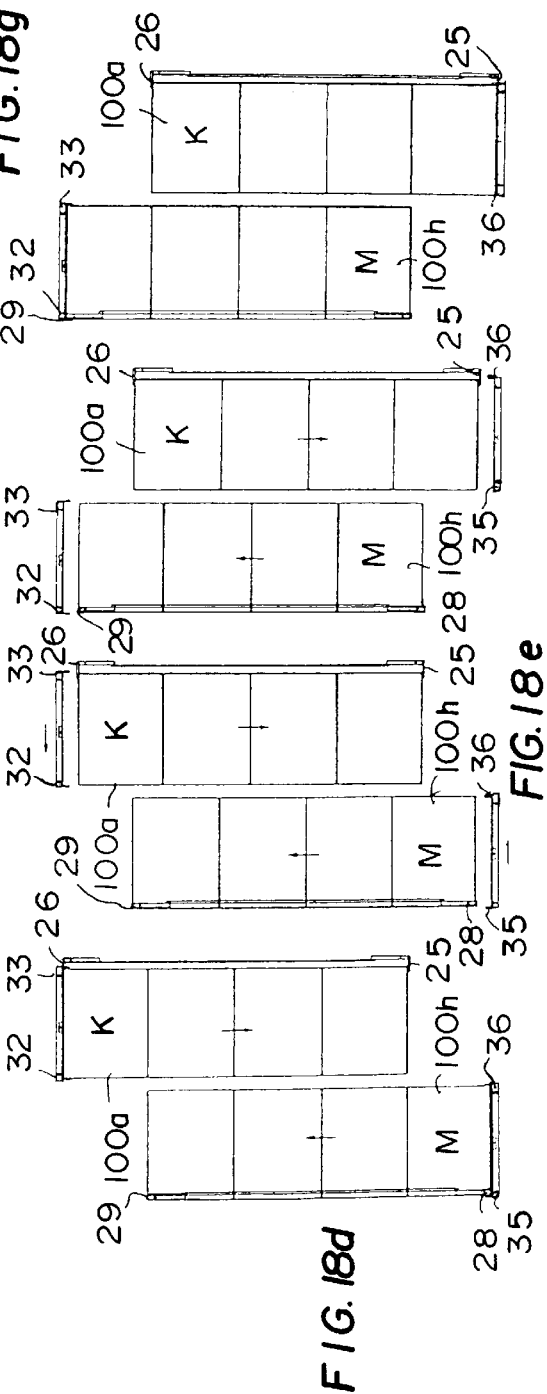

COMPACT STORING AND RETRIEVING APPARATUS PARTICULARLY USEFUL FOR AIRCRAFT

RELATED APPLICATIONS

The present application is a Continuation-In-Part of my Application Ser. No. 08/692,995, filed Aug. 6, 1996, now abandoned.

FIELD AND BACKGROUND OF THE INVENTION

The present invention relates to compact storing and retrieving apparatus enabling various types of devices to be stored in a compact manner and to be conveniently retrieved whenever desired.

The invention is particularly useful for aircraft in order to maximize the utilization of passenger space and/or cargo space within the aircraft, and the invention is therefore described below particularly with respect to such an application. Examples of such applications of the invention are described in my prior U.S. Pat. Nos. 5,159,994, 5,205,515 and 5,314,143; and reference is made to the disclosures therein, and also to the publications cited during their examinations.

OBJECTS AND BRIEF SUMMARY OF THE INVENTION

A broad object of the present invention is to provide apparatus for compactly storing and retrieving devices. A further object is to provide such apparatus which is of a relatively simple construction and which securely retains all the devices against all movements except those involved during an actual storing or retrieving operation. A still further object is to provide an aircraft with such storing and retrieving apparatus to maximize the limited floor space within the aircraft for storing and retrieving various types of article holders, such as containers, carts, pallets, carried by the aircraft.

According to one aspect of the present invention, there is provided apparatus for compactly storing and retrieving a plurality of movable devices of the same size and external configuration, comprising: a support for horizontally supporting the plurality of movable devices in the form of at least one two-dimensional matrix constituted of two columns and a plurality of rows of two devices in each row, with each device in abutting relation with the adjacent devices on its opposite longitudinal sides, and with a vacant space for one device in the first and last rows of the matrix; two longitudinal transfer assemblies, one for each of the columns, each assembly including a pair of L-shaped retainer members engageable with the outer corners of the first device and the last device in the respective column; and two transverse transfer assemblies, one for the first row of the matrix and the other for the last row of the matrix, each of the latter assemblies including a pair of L-shaped retainer members engageable with the outer corners of the device in the first row and the device in the last row, respectively. The apparatus further includes a longitudinal drive for driving, in opposite longitudinal directions, the two longitudinal transfer assemblies and the devices in their respective columns while the longitudinal sides of the devices are maintained in firm abutting relation by the pair of retainer members in each of the two longitudinal transfer assemblies; and a transverse drive for driving, in opposite transverse directions, the two transverse transfer assemblies and the devices in their respective first and last rows while the longitudinal sides of the devices in the first and last rows are maintained in abutting relation with the longitudinal sides of the devices in the adjacent rows, such that all the devices are always secured against any movement other than those produced by the transfer assemblies.

According to further features in the described preferred embodiments, the longitudinal drive comprises a common longitudinal drive motor for driving both of the longitudinal transfer assemblies simultaneously the same amount in opposite longitudinal directions. Also, the transverse drive comprises a common transverse drive motor for driving both of the transverse transfer assemblies simultaneously the same amount in opposite transverse directions. It will be appreciated, however, that there could be a separate drive for each of the above assemblies.

According to still further features in the described preferred embodiments, the horizontal support is a floor formed with an opening of slightly larger size than the size of one of the movable devices; and the apparatus further comprises a lift assembly including a horizontal platform of the same size and configuration as the opening in the horizontal floor, and a vertical drive for driving the platform to a position flush with the floor to receive one of the devices, or to another position vertically spaced from the floor to transfer the received device to another vertical level.

As will be described more particularly below, such apparatus securely retains the devices against any movement at all times except during an actual storing or retrieving operation, thereby making the apparatus particularly suitable for aircraft. In addition, such apparatus requires only three motors, one for each of the longitudinal, transverse and vertical drives, thereby enabling the apparatus to be greatly simplified as compared to the apparatus described in my prior patents referenced above.

As will also be described more fully below, the novel apparatus is particularly useful for aircraft in order to maximize the floor space within the aircraft for storing and retrieving various types of article holders, such as containers, carts, pallets, and the like, carried by the aircraft.

According to a still further aspect of the present invention, there is provided an aircraft for compactly storing and retrieving a plurality of movable article holders each capable of holding at least one article, e.g., a cart or container, comprising: a support for movably supporting the plurality of article holders; a lift assembly for receiving an article holder and for transferring it to another vertical level to enable accessing and retrieving selected article holders; a drive for driving the plurality of article holders and said lift in order to permit the article holders to be selectively accessed and retrieved; and an electrical control system for controlling the drive. The control system includes sensors on the lift assembly for sensing the content status of an article holder received on said lift assembly, and for preventing operation of the drive if the article holder received on the lift assembly is not completely full or completely empty.

Further features and advantages of the invention will be apparent from the description below.

BRIEF DESCRIPTION OF THE DRAWINGS

The invention is herein described, by way of example only, with reference to the accompanying drawings, wherein:

FIGS. 4 and 5 are top plan views more particularly illustrating the longitudinal transfer assemblies in the apparatus of FIGS. 2 and 3;

FIGS. 6a–6g diagrammatically illustrate the operation of the apparatus;

FIGS. 18a–18g illustrate a modification in the operation of the apparatus as compared to FIGS. 6a–6g;

DESCRIPTION OF PREFERRED EMBODIMENTS

AN UPPER GALLEY EMBODIMENT

Figure 1:
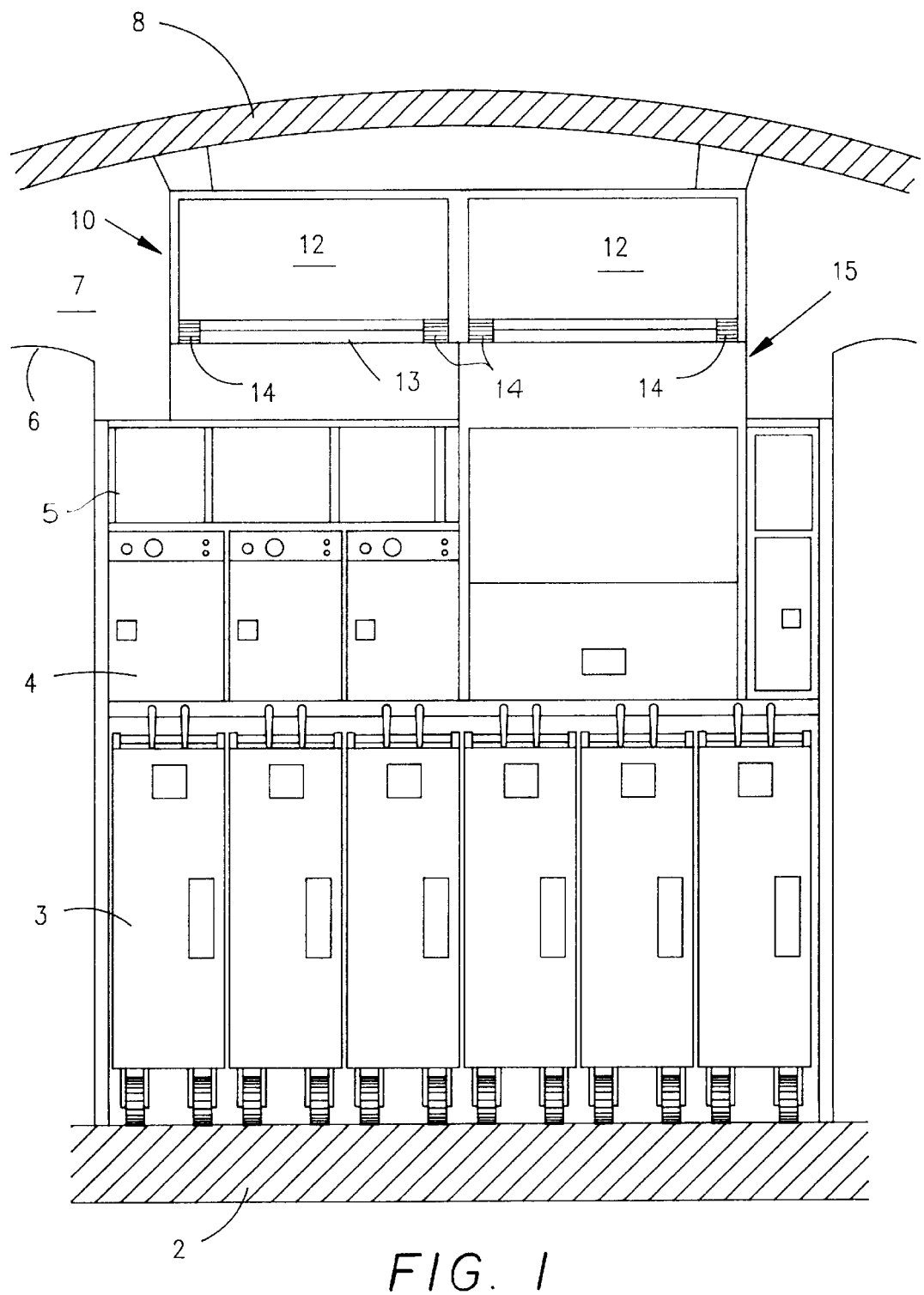
FIG. 1 illustrates an upper galley in an aircraft incorporating one form of apparatus constructed in accordance with the present invention for compactly storing and retrieving food containers to be used in the upper galley.

FIG. 1 illustrates an upper galley section of an aircraft equipped with apparatus in accordance with the present invention for compactly storing and retrieving a plurality of article holders, e.g., containers used for supplying the food articles to be served, and/or for receiving the trash to be disposed. The illustrated galley section includes the deck 2, a plurality of wheeled carts or trolleys 3 movable on the deck, and a plurality of ovens 4, cabinets 5 and the like, all mounted between the galley ceiling 6 and the deck 2. The space 7 between the ceiling 6 and the outer fuselage 8 is used for accommodating the storing and retrieving apparatus, generally designated 10 in FIG. 1. Apparatus 10 compactly stores and retrieves a plurality of article holders, in this case containers 12, each supported on a horizontal floor 13 by rollers 14. Containers 12 may include standard in-flight type containers, such as ATLAS or KSSU, provided in galleys for storing food articles to be served to the passengers, and/or for receiving trash to be disposed. Rollers 14 may be spherical rollers or balls to permit shifting the containers in any direction.

As will be described more particularly below, the plurality of containers 12 are arranged according to a two-dimensional matrix and may be shifted along both axes in order to locate any selected container at a particular location in the matrix. Floor 13 at this particular location of the matrix is formed with an opening to receive the platform of a lift assembly, generally designated 15, so that containers 12 may be selectively removed from, or inserted into, the two-dimensional matrix of containers supported on floor 13.

Figure 2:
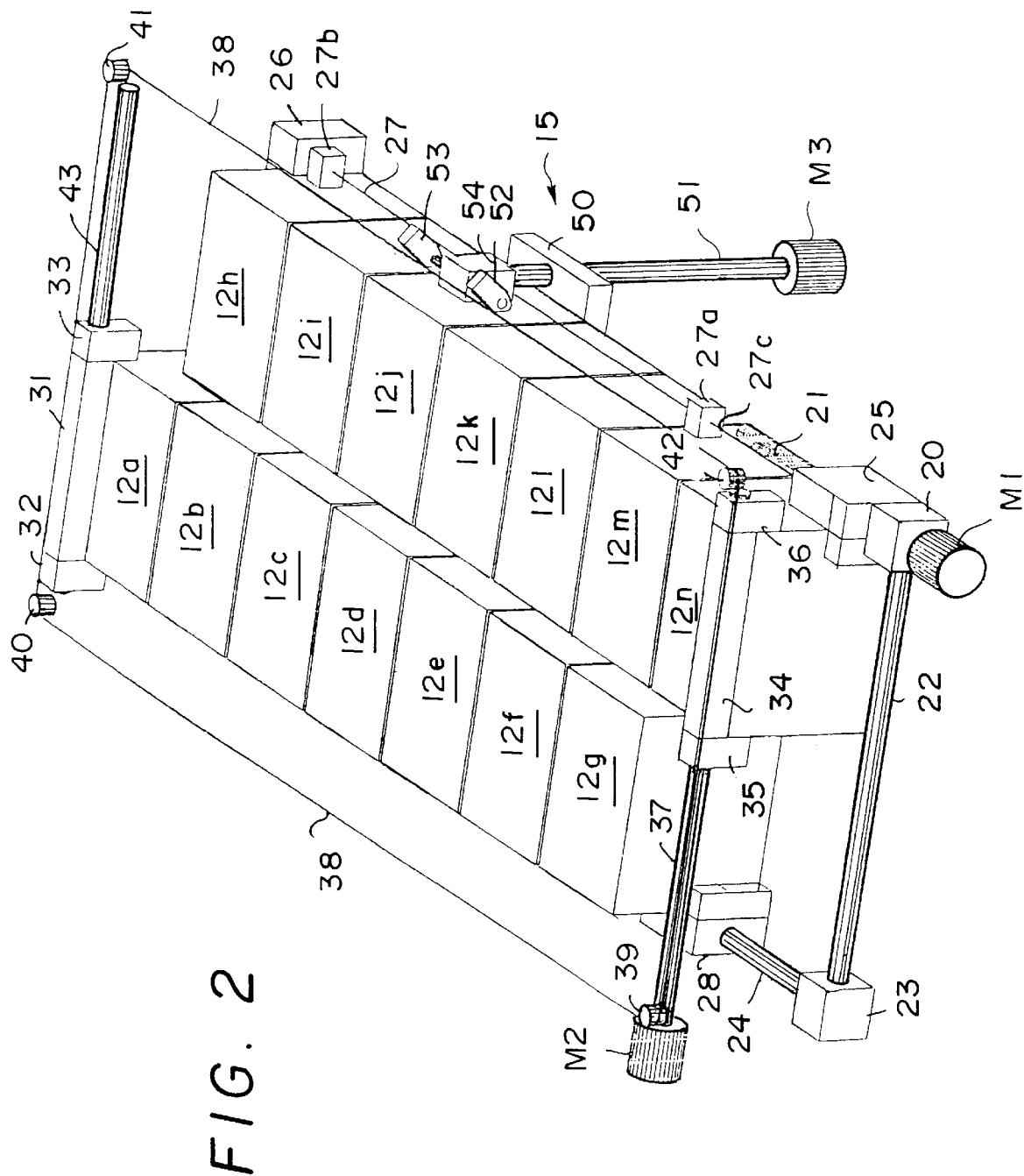
FIG. 2 diagrammatically illustrates the storing and retrieving apparatus included in the galley of FIG. 1.

As shown more particularly in FIG. 2, all the containers, therein designated 12a–12n, are of the same external size and configuration. They are arranged according to a two-dimensional matrix constituted of a first column of containers 12a–12g, and a second column of containers 12h–12n. The two-dimensional matrix provides a vacant space for one container in each of the first and last rows of the matrix. In the example illustrated, the matrix is constituted of fourteen containers arranged in two columns and seven rows, i.e., seven containers in each column, and two containers in each row. As also shown in FIG. 2 (as well as in FIGS. 6a–6g to be described below), each container is in abutting relation with the adjacent containers on its opposite longitudinal sides. The two end containers in each column are engageable by their respective longitudinal L-shaped retainer members 25, 26 and 28, 29, and transverse retainer numbers 35, 36, 32, 33 respectively, to be described below, such that all the containers are always secured against any movement other than that produced by the transfer assemblies.

FIG. 2 illustrates the two columns in a staggered relation with respect to each other, such that the first container 12a in the first column is not aligned with a container in the second column, and the last container 12n in the second column is not aligned with a container in the first column. As a result, there is an empty space in the last row of the first column, and also an empty space in the first row of the second column. When the two columns are aligned (e.g., as shown in FIGS. 6e and 6f), each container in the first column would be aligned with a container in the second column.

The illustrated apparatus includes three drive motors: $M_1$, $M_2$ and $M_3$. Drive motor $M_1$ drives two longitudinal transfer assemblies, one for each of the two columns of containers 12a–12n; motor $M_2$ drives two transverse transfer assemblies, one for a container in the first row (e.g., container 12a), and another for a container in the last row (e.g., container 12n); and motor $M_3$ drives the lift assembly 15.

The two longitudinal transfer assemblies driven by motor $M_1$ include a gear box 20 driving a screw 21 and a right-angle shaft 22. Shaft 22 in turn drives, via another gear box 23, another screw 24 parallel to screw 21. The foregoing transmission, including the two gear boxes 20, 23 and the two screws 21, 24, is such that when motor $M_1$ is operated, screw 21 is rotated in one direction whereas screw 24 is rotated equally but in the opposite direction from screw 21. Screw 21 drives the longitudinal transfer assembly for the right column of containers in one direction, whereas screw 24 drives the longitudinal transfer assembly of the left column of containers the same amount but in the opposite direction.

The longitudinal transfer assembly for the right column of containers includes the two previously-mentioned L-shaped retainer members 25, 26, which are interconnected by a push-pull linear mechanical transmission, generally designated 27, so that both retainer members always move together the same amount and in the same direction. Many push-pull linear mechanical transmissions are known for this purpose, such as those supplied by Teleflex Inc., North Wales, Pa. FIGS. 4 and 5 diagrammatically illustrate such a transmission 27 as including a stationary casing having an inlet opening 27a at one end and an outlet opening 27b at the opposite end for an inner core 27c generally movable between two rows of ball bearings (not shown) for transmitting linear motion from one retainer member 25 to the other retainer member 26.

The two retainer members 25, 26 are of L-shaped configuration so as to engage the two faces at the outer corner of the first container 12h and the last container 12n in the respective column. Rotation of screw 21 will thus cause the two retainer members 25, 26, engaging the outer corners of the two end containers 12h, 12n, to move the complete column of containers together in one longitudinal direction, according to the displacement of the screw. FIG. 4 illustrates this column of containers in an initial position, and FIG. 5 illustrates the same column of containers after they have been moved one position.

As also shown particularly in FIGS. 4 and 5, the longitudinal transfer assembly acting on the left column of containers is similarly constructed and moves the same amount but in the opposite longitudinal direction. This transfer assembly includes the two previously-mentioned L-shaped retainer members 28, 29 engageable with the outer faces of the first container 12a and the last container 12g in that column. These retainer members are interconnected by a push-pull linear mechanical transmission 30 similar to transmission 27. Thus, when motor $M_1$ is operated to move the column of containers 12h–12n in one direction (downwardly in FIG. 5), containers 12a–12g in the other column are moved the same amount but in the opposite direction (upwardly in FIG. 5).

As indicated earlier, the illustrated apparatus also includes a pair of transverse transfer assemblies driven by motor $M_2$. One transverse transfer assembly includes a carriage 31 carrying a pair of L-shaped retainer members 32, 33 on its opposite sides engageable with the outer corners of the first container in one column (container 12a in FIG. 2); whereas the other transverse transfer assembly includes a carriage 34 carrying a pair of L-shaped retainer members 35, 36 on its opposite sides engageable with the outer corners of the last container in the other column (container 12n) in FIG. 2. Carriage 34, including the two retainer members 35, 36, is driven by a screw 37 rotated by motor $M_2$, and is connected to carriage 31 at the opposite end of the matrix by a closed-loop belt 38 wound around guiding rollers 39–42 at the four corners of floor 13 supporting the matrix of containers 12a–12n. It will thus be seen that as motor $M_2$ is energized to rotate screw 37, carriage 34 is driven linearly in one transverse direction, whereas carriage 31 at the opposite end is also driven linearly the same amount but in the opposite transverse direction. The movement of carriage 31 is guided by guiding tube 43.

Lift assembly 15, driven by motor $M_3$, is used in order to remove one of the containers 12a–12n from the supporting floor 13 and to lower it to a location conveniently accessible to the attendant for manual removal of the container or of the items within the container. The lift assembly may also be used for the opposite purpose, that is, to return or fill the container from the lower location.

Horizontal floor 13 is formed, at one of the locations in the two columns, with an opening which is of the size and configuration as, but slightly larger than, one of the containers. FIG. 2 illustrates this opening at the location occupied by container 12j. Normally, platform 50 of the lift assembly 15 occupies this opening in floor 13 so that the containers 12a–12n may be shifted, both longitudinally and transversely as will be described below, to locate one of the containers (container 12j in FIG. 2) on the lift platform 50, whereupon the lift platform may be lowered by motor $M_3$ driving screw 51 to lower the selected container.

Lift assembly 15 also includes a pair of retainer members 52, 53 connected together by a gear box 54 driven by screw 51 to engage the outer faces of the containers straddling the opening in floor 13 occupied by the lift platform 50. When the lift platform 50 is in its normal raised position, flush with the floor 13, retainer members 52, 53 are in their non-operative positions as shown in FIG. 2. However, when motor $M_3$ is energized to lower the lift platform 50 with a container thereon, the two retainer members 52, 53 are actuated via gear box 54 to engage the outer faces of the two containers (in this case containers 12i, 12k) straddling the opposite sides of the selected container (12j) being removed, so as to firmly secure the other containers in the column against any movement when the selected container (12j) is removed from that column).

Figure 7:
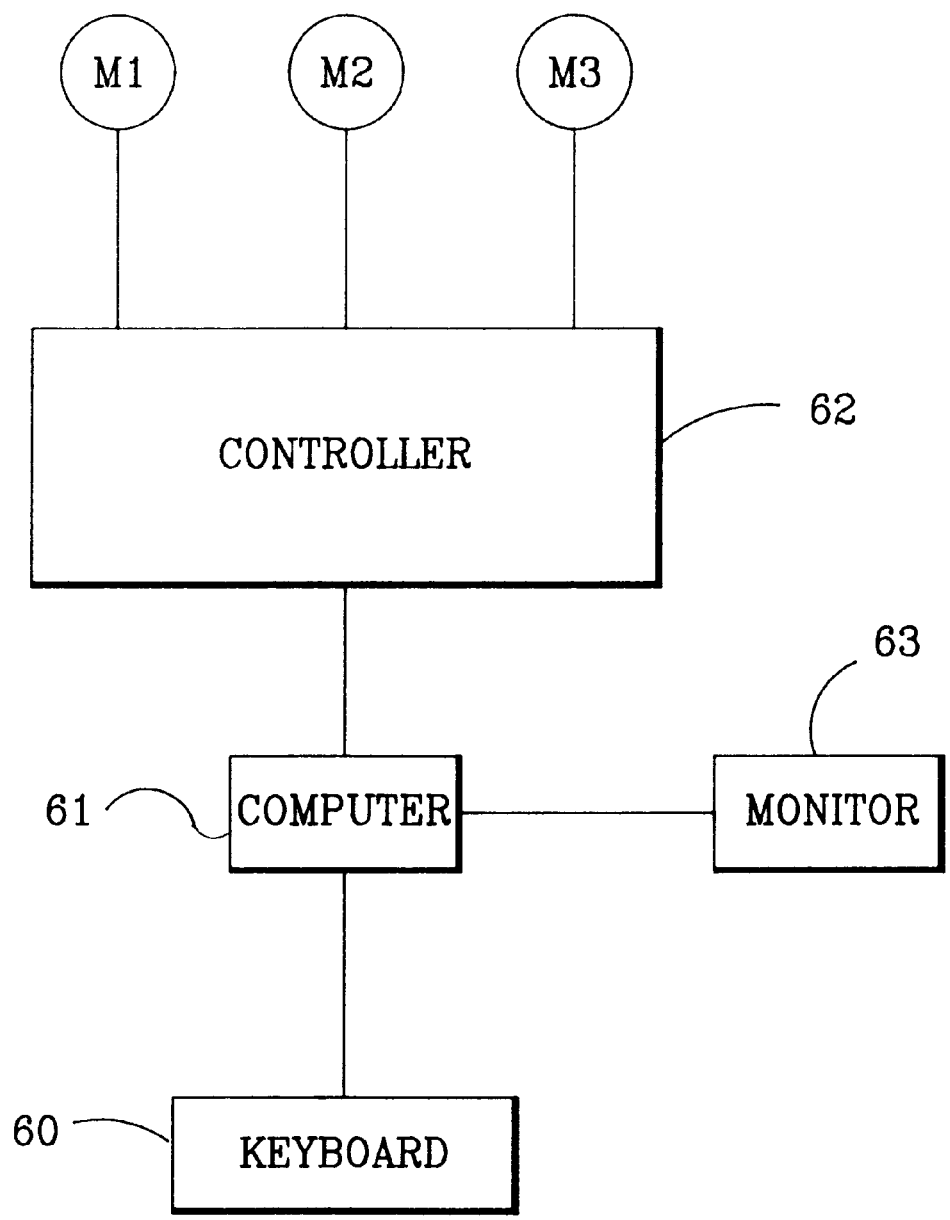
FIG. 7 is a block diagram illustrating the motor control system.

FIG. 7 diagrammatically illustrates a control system for controlling the motors $M_1$, $M_2$ and $M_3$. Thus, the illustrated system includes a keyboard 60 enabling inputs to be manually made to a computer 61 which controls the three motors $M_1$, $M_2$ and M via a controller 62. The data processed by computer 61 is displayed in a monitor 63.

OPERATION

The apparatus of FIGS. 1–7 is used for storing and retrieving any selected container 12a–12n in the following manner:

Whenever a selected container is to be stored or retrieved, all the containers in the matrix are shifted, either clockwise or counter-clockwise, depending on the shortest distance to the lift which determines the direction of rotation of the two motors $M_1$ and $M_2$. Platform 50 of the lift assembly 15 is thus utilized for retrieving the selected container from those supported on floor 13, or for introducing a container into a selected position on floor 13. The shifting of the containers is effected by the L-shape retainer members 25, 26 and 28, 29 of the two longitudinal transfer assemblies, and by L-shaped retainer members 32, 33 and 35, 36 of the two transverse transfer assemblies. As indicated earlier, each of the containers 12a–12n is supported on rollers 14 which permit the longitudinal and transverse shifting movements of the containers.

An important feature of the illustrated apparatus is that all the containers are always secured against any movement when the containers are not being shifted, and are also secured against any movement other than the shifting movements during the shifting process as well as during the lowering process. FIGS. 6a–6g show the various steps involved when shifting the containers (clockwise in this example) in this manner.

FIG. 6a illustrates the initial condition of the containers as shown in FIGS. 2 and 4. In this condition, the retainer members 28 and 29 of the longitudinal transverse assembly acting on the column including container 12a, had previously shifted that column (upwardly, FIG. 6a) by one position, whereas the retainer members 25, 26 of the longitudinal transverse assembly acting on the second column including container 12n had previously shifted that column (downwardly, FIG. 6a) one position. Thus, longitudinal retainer members 25, 26 and 28, 29 engage the outer corners of the four end containers 12h, 12n and 12a, 12g, respectively, and maintain the inner longitudinal sides of these containers in abutting contact with the longitudinal sides of the adjacent containers. The longitudinal sides of the remaining containers are thereby also maintained in abutting contact with the longitudinal sides or their adjacent containers.

Motor $M_2$ of the two transverse transfer assemblies is now operated such that retainer members 32, 33 of carriage 31 engaging container 12a shift that container transversely to a middle position between the two columns; similarly, retainer members 35, 36 of carriage 34 simultaneously shift container 12n the same amount but in the opposite direction transversely to a middle position. It will be seen that in this condition (shown in FIG. 6b), containers 12a, 12n, being in the illustrated middle position, securely retain all the containers in the two columns against any displacement.

Before motor $M_2$ is operated to shift the two end containers 12a, 12n transversely, the longitudinal transverse assemblies may be operated by motor $M_1$ such that one side the bottom of container 12a is slightly spaced from the facing side of container 12h, and similarly one side of the bottom of container 12n is slightly spaced away from the facing side of container 12g, to eliminate the possibility of jamming when the containers are transversely-shifted.

After the two end containers 12a, 12n have thus been shifted midway towards the next column (FIG. 6b), motor $M_1$ is operated to move the two pairs of retainer elements 28, 29 and 25, 26 of the two longitudinal transfer assemblies to the positions illustrated in FIG. 6c, wherein retainer member 29 engages container 12b, and retainer member 25 engages container 12m, to thereby maintain the containers in firm abutting relation to each other.

Motor $M_2$ is then again operated to cause the two retainer members 32, 33 to complete the transverse movement of container 12a to the second column, and to cause retainer members 35, 36 to complete the movement of container 12n to the first column (FIG. 6d). Motor $M_1$ is now operated to cause its retainer members 28, 29 to shift the left column upwardly one-half step, and to cause retainer members 25, 26 to shift its column downwardy one-half step, to the positions shown in FIG. 6e. Motor $M_2$ is then operated to shift the two transverse carriages 31, 34, and their retainer members 32, 33 and 35, 36, respectively, to become aligned with the left and right columns, respectively, as shown in FIG. 6f. Finally, motor $M_1$ is operated to cause the carrier members 25, 26 and 28, 29, respectively, of the two longitudinal transfer assemblies to shift their respective columns the remaining one-half step to the positions illustrated in FIG. 6g.

When the foregoing operations have been completed, it will be seen that the apparatus is in the same condition as at the beginning of the shifting process except that all the containers have been shifted one position in the clockwise direction. It will also be seen that during every step in this shifting process, all the containers are secured against any displacement except that produced by the longitudinal and transverse transfer assemblies during the shifting process.

Figure 3:
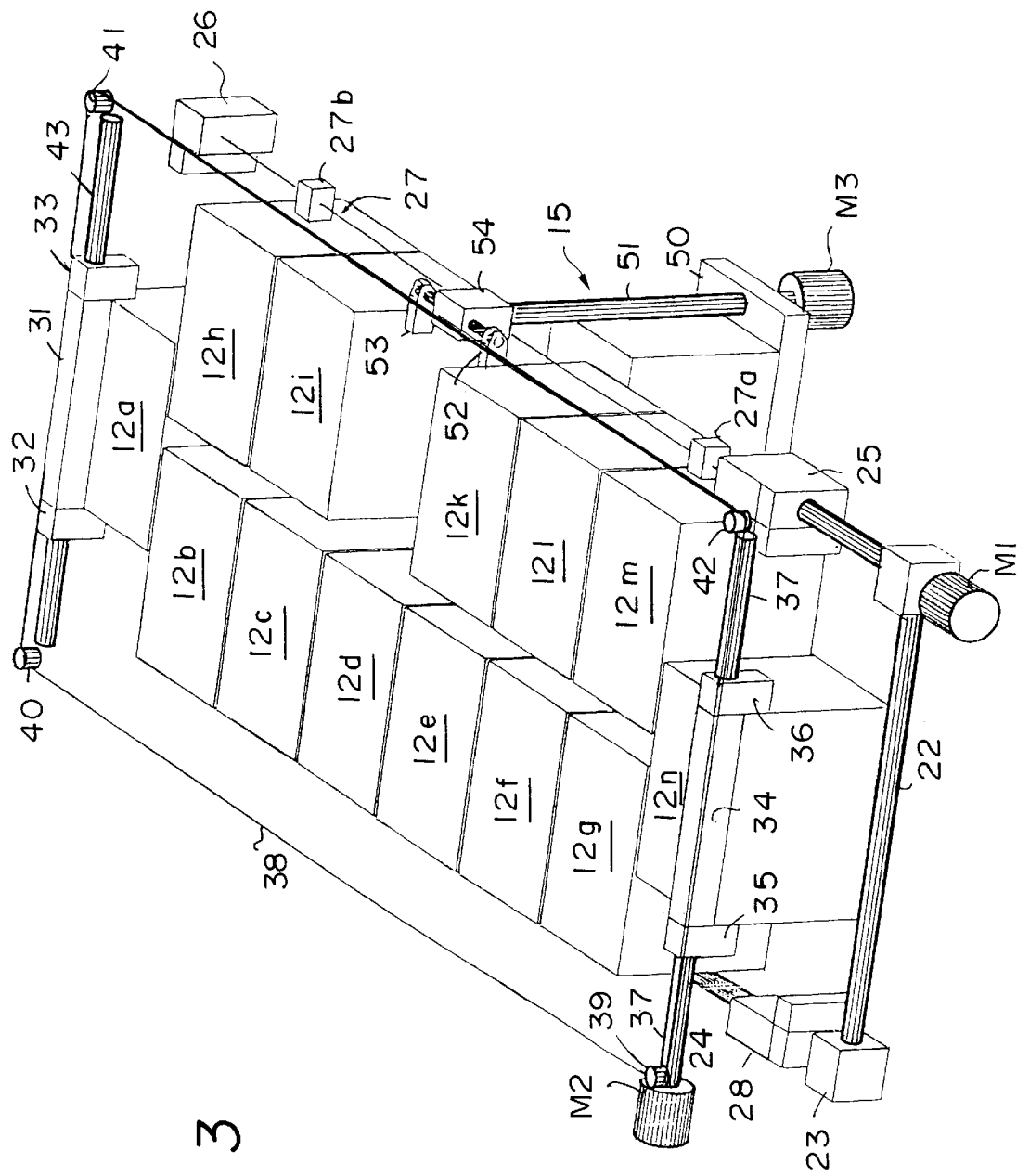
FIG. 3 illustrates the apparatus of FIG. 2 but in a different condition.

The foregoing shifting process is produced in order to shift a selected container to the lift platform 50. When the selected container is on the lift platform, motor $M_3$ is operated to lower the platform, and thereby the container thereon, to a position conveniently accessible by the attendant. As soon as the container on platform 50 is lowered so as to be out of engagement with the two containers straddling the opening occupied by the platform 50, the two retainer members 52, 53 are actuated to their operative positions, as illustrated in FIG. 3, to engage the sides of the two containers straddling this opening, and thereby to secure these containers against any displacement. The two retainer members 52, 53 remain in this actuated condition until platform 50 is returned into the matrix of containers, so that the container on the lift platform 50 now becomes effective to secure the containers in the respective column against any undesired displacement.

It will be appreciated that the movement of the transverse carriers can be performed at the same time that the lift 50 is being operated, thereby reducing the loading/unloading and retrieving time.

ANOTHER UPPER GALLEY EMBODIMENT

Figure 8:
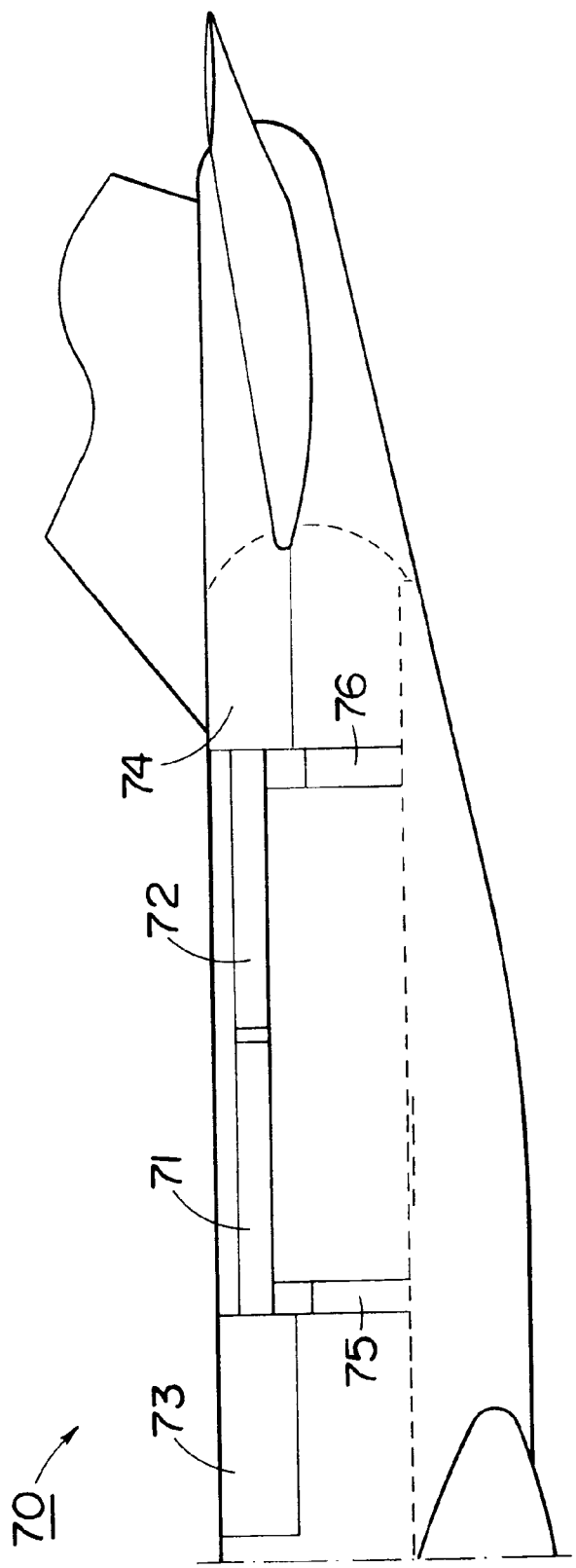
FIG. 8 diagrammatically illustrates the aft section of an aircraft including an upper galley storage system constructed in accordance with the present invention.

FIG. 8 illustrates the aft section of an aircraft provided with two storage compartments 71, 72, such as described above, between two overhead crew rest compartments 73, 74. Each storage compartment 71, 72 includes a lift assembly 75, 76, at the respective end of the storage compartment. Locating the lift position at an end of the storage compartment enables the ceiling space of the aft section of the aircraft to be better utilized, and also provides more flexibility in the galley floor location.

Storage compartments 71, 72 including their respective lift assemblies 75, 76, may be constructed as described above with respect to FIGS. 1–7. FIGS. 9–13 illustrate constructions of the storage compartment and lift assembly similar to those described above but including several modifications.

One modification is that redundancy is provided for each of the drive motors $M_1$–$M_3$. Thus, the longitudinal transfer assembly includes two motors $M_{1a}$, $M_{1b}$ (FIG. 9a); the transverse transfer assembly includes two motors $M_{2a}$, $M_{2b}$ (FIG. 9); and the lift assembly, includes two motors $M_{3a}$, $M_{3b}$.

According to another modification, instead of mounting the containers (or other types of article holders) by rollers (corresponding to rollers 14, FIG. 1) carried by or engageable with the bottoms of the article holders, the article holders are supported in suspension for longitudinal movement by rollers in a manner which makes the rollers more accessible for repair or maintenance purposes, reduces friction, and also reduces the noise to the passengers.

Figure 9:
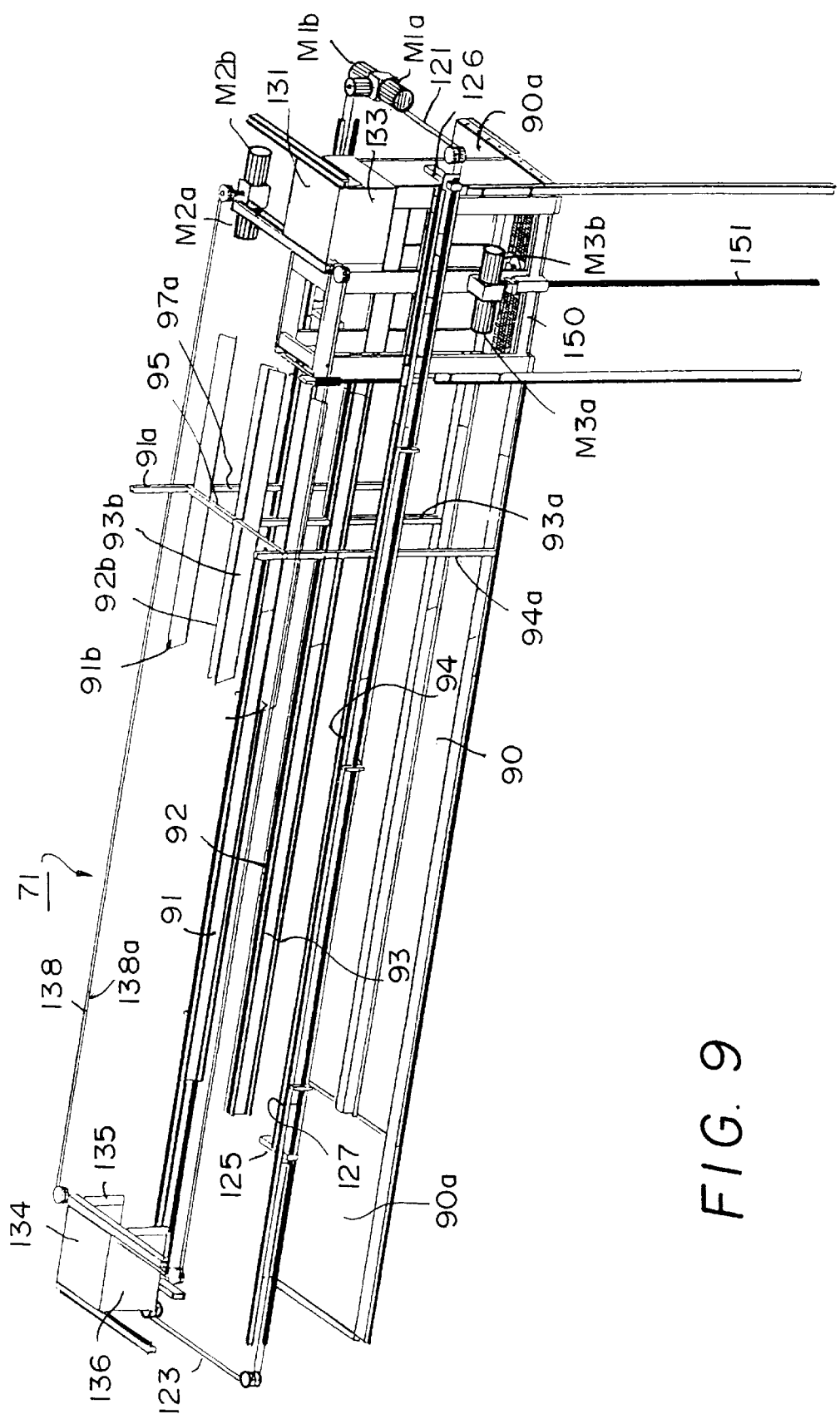
FIG. 9 diagrammatically illustrates an aircraft storage system similar to that of FIGS. 1–7 but including a number of modifications.
Figure 11:
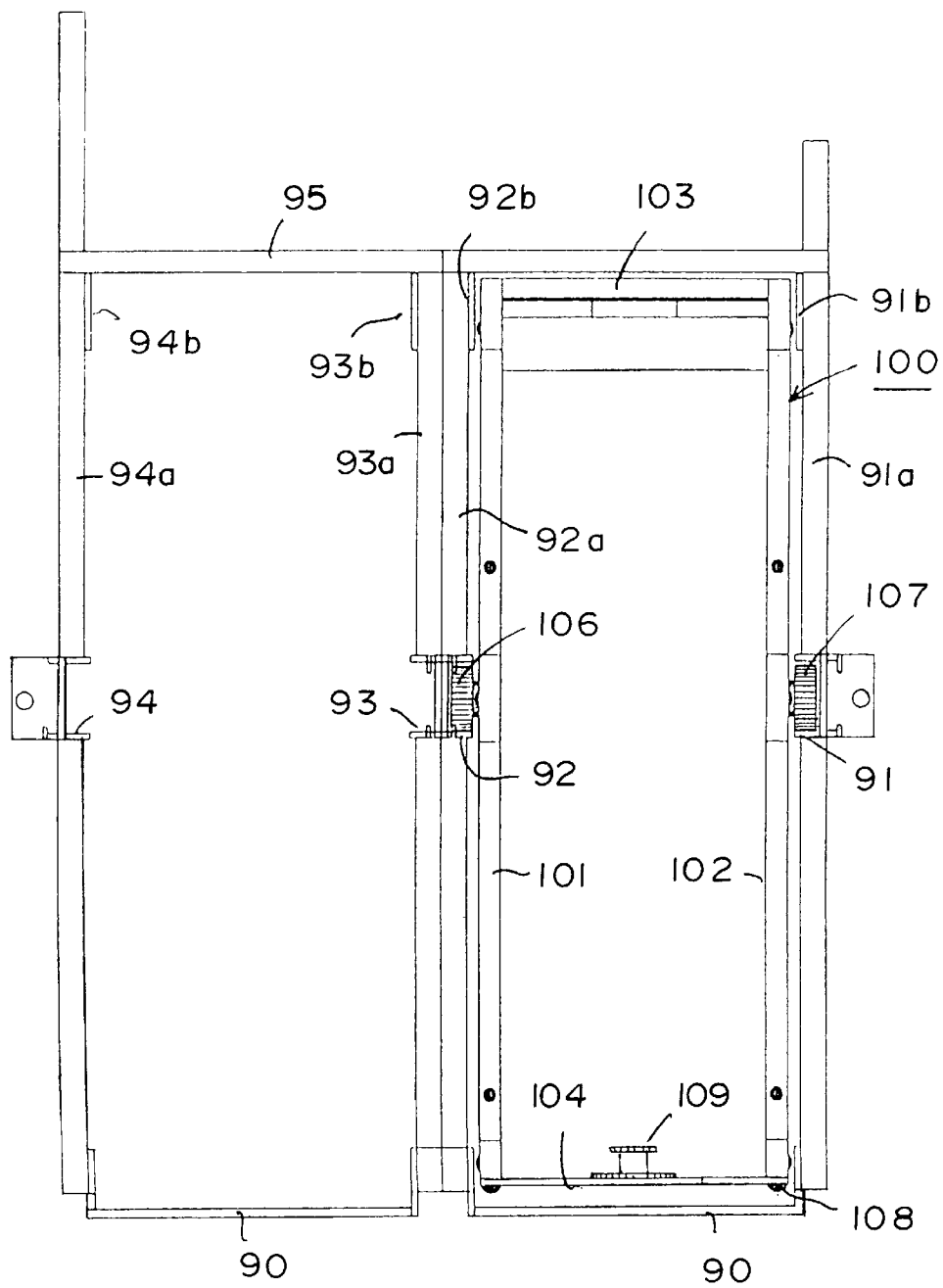
FIG. 11 is a cross-section illustrating two carrier members and the manner in which they are supported for longitudinal movement.

FIGS. 9 and 11 more particularly illustrate the construction of one of the storage compartments 71, 72. Each storage compartment includes a floor 90 spanned by four longitudinally-extending tracks 91–94 (FIG. 11). These tracks are mounted on a plurality of groups of vertically-extending frame members 91a–94a longitudinally spaced along the length of the compartment. The groups of vertically-extending frame members 91a–94a are secured together by a plurality of longitudinally-extending frame members 91b–94b, and a plurality of transversely-extending frame members 95.

The four tracks 91–94 are mounted midway of the h eight of the storage compartment (FIG. 11) and terminate short of the ends of the compartment so as not to overlie a flat end section of the floor 90a extending transversely at each of the opposite ends of the compartment. The tracks 91–94 are used for supporting the article holders in suspension spaced slightly above the compartment floor 90 to permit the article holders to be shifted longitudinally of the compartment, while the transverse sections 90a of the floor permit the article holders to be shifted transversely of the compartment on balls, low-friction slide bars, or the like, as will be described below.

Figure 10:
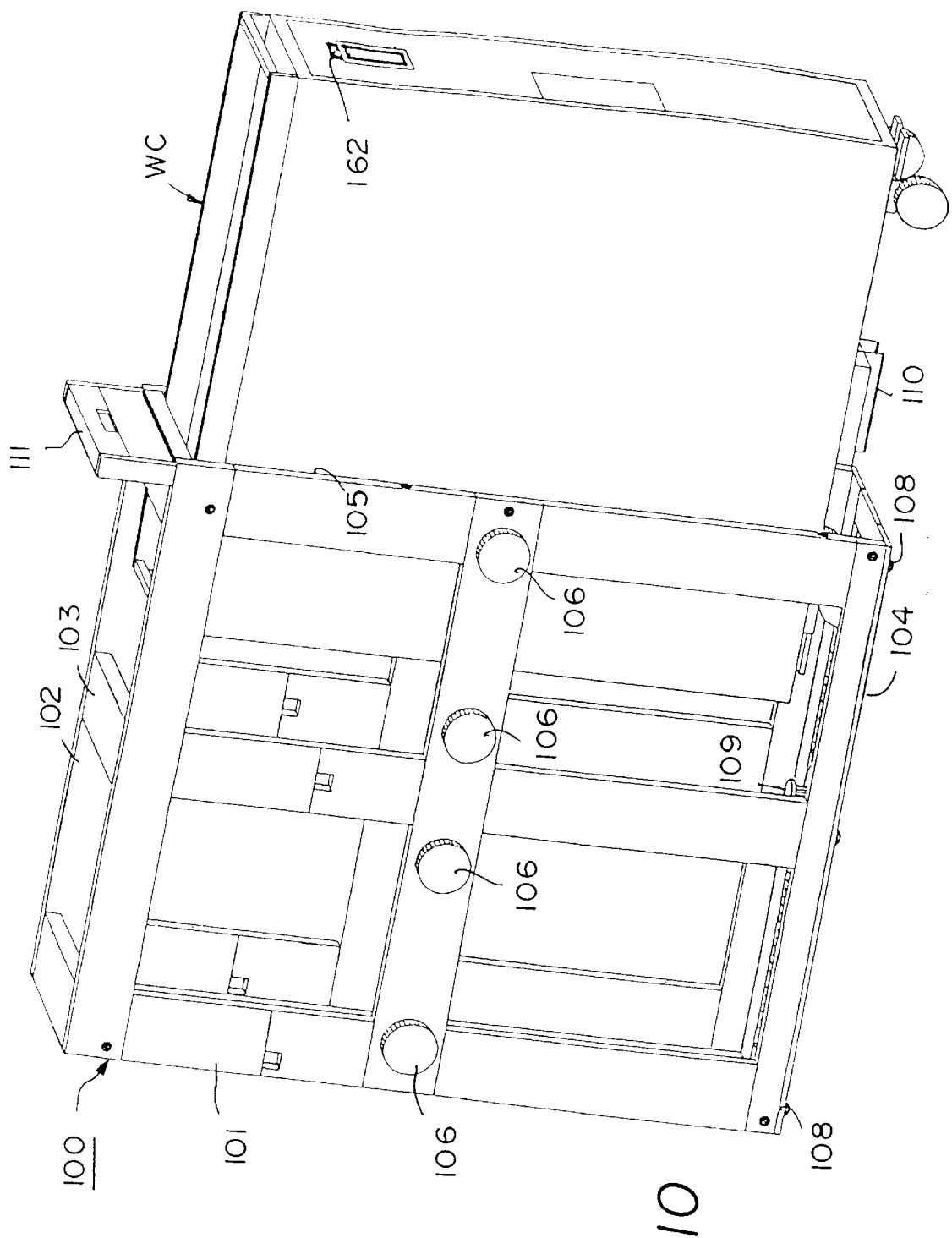
FIG. 10 illustrates an article holder in the form of a carrier member receiving a wheeled cart to be stored and retrieved in the system of FIG. 9.

Each of the article holders is received within a carrier member, generally designated 100 in FIGS. 10–13. In FIG. 10, the article holder is in the form of a wheeled cart or trolley, generally designated WC; whereas in FIG. 13, it is in the form of a food or luggage container, generally designated FC. Carrier member 100 may also accommodate two wheeled half-carts, one of which is shown at WC' in FIG. 12. In addition to carts and containers, the article holders may also be in the form of pallets for stacking smaller containers.

Carrier member 100 is of an open frame construction, including side walls 101, 102, a top wall 103 and a bottom wall 104. One end 105 of the carrier member is open for receiving the article holder carried thereby, shown as a wheeled cart WC in FIG. 10, one (or two) wheeled half-carts WC' in FIG. 12, and a non-wheeled food or luggage container FC in FIG. 13. A carrier member 100 may also be conveyed while empty.

Each side wall 101, 102 of the carrier member 100 is provided with a horizontal line of rollers 106, 107, located so as to be received within the tracks 91–94 of the storage compartment. Each carrier member 100 is further provided with a plurality of spherical rollers or balls 108 projecting from its bottom wall 104. Rollers 106, 107 support the carrier member 100, and its article holder, in suspension above the compartment floor and permit their longitudinal movement within the compartment. Since the tracks 91–94 terminate short of the ends of their respective compartment, they permit the carrier members, at the ends of the compartment, to lower until their spherical rollers 108 engage the transverse sections 90a of the floor 90 at each end of the compartment for transverse movement during the above-described shifting operation. For this purpose, the end sections 90a of the floor 90 may be slightly raised from the remainder of the floor.

Figure 12:
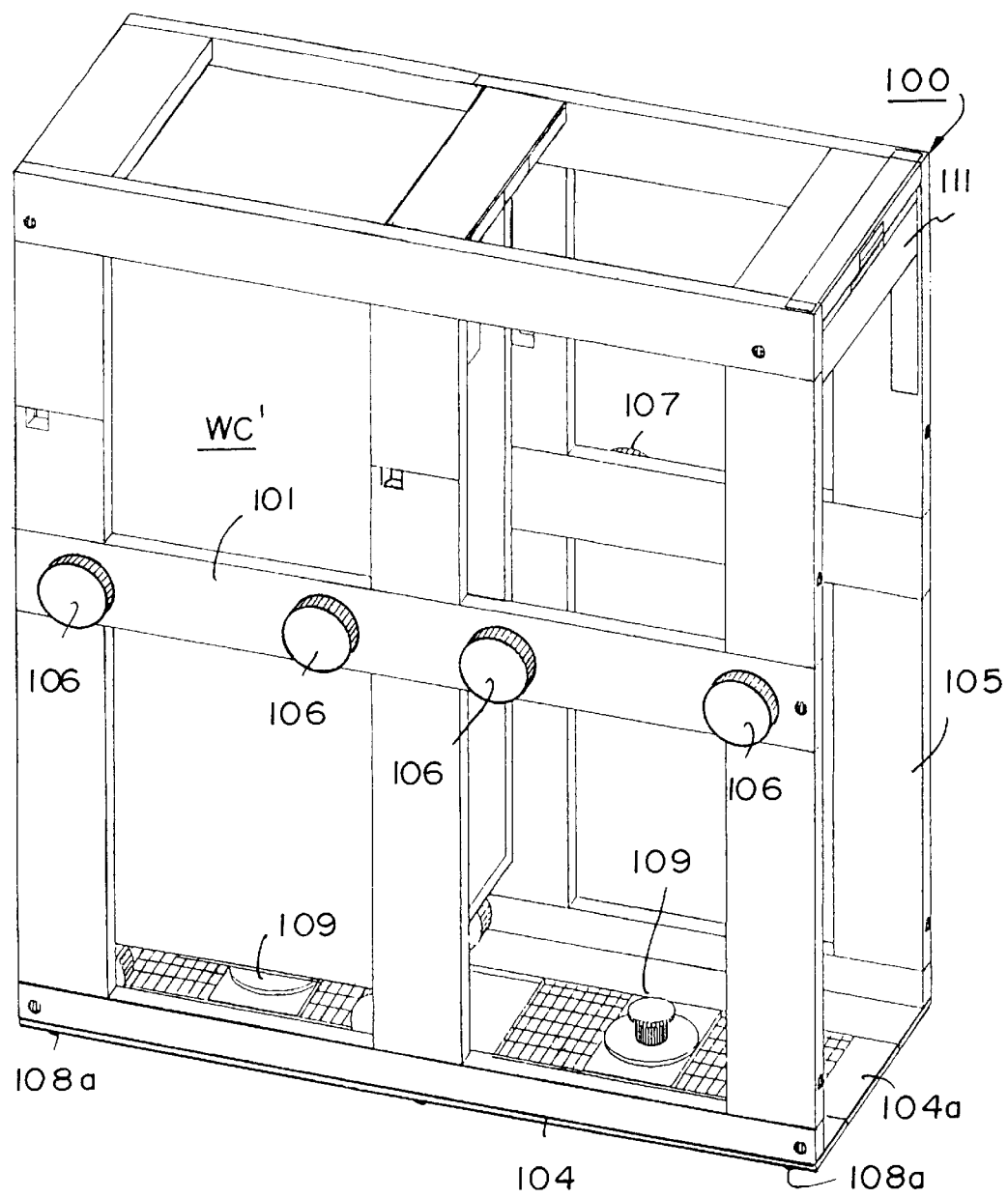
FIG. 12 is a three-dimensional view illustrating a carrier member for receiving two half-carts.

The bottom wall 104 of each carrier member 100 for a wheeled cart is further provided with a mushroom-type projectible/retractible anchoring member 109 of known construction. These may be projected into a channel member 110 (FIG. 10) carried at the bottoms of such carts in order to immobilize the carts when received within their respective carrier members. Carrier members for single carts WC, such as shown in FIG. 10, would be provided with a single anchoring member 109, whereas carrier members for two half-carts WC', such as shown in FIG. 12, would be provided with two such anchoring members. A carrier member for a non-wheeled food container FC, such as shown at FC in FIG. 13, would not need such an anchoring member.

Figure 13:
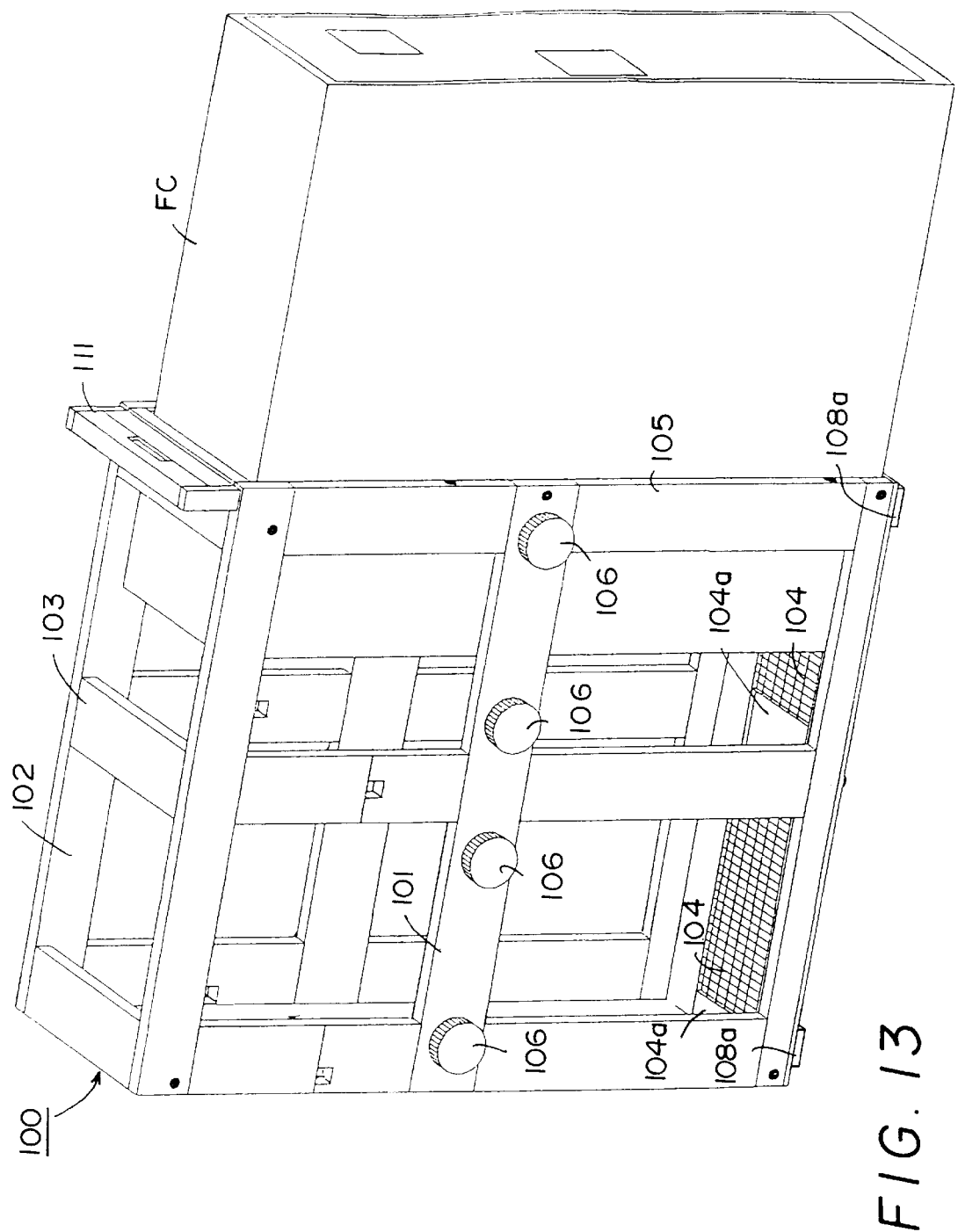
FIG. 13 illustrates a carrier member for receiving a container, such as for food or luggage, to be stored and handled in accordance with the present invention.

All of the above types of carrier members 100 further include a slidable latch 111 which may be moved to an open position, as shown in FIGS. 10 and 13, for receiving the article holder, and then moved to a closed position (FIGS. 11 and 12) to secure the article holder within the carrier member.

Figure 9A:
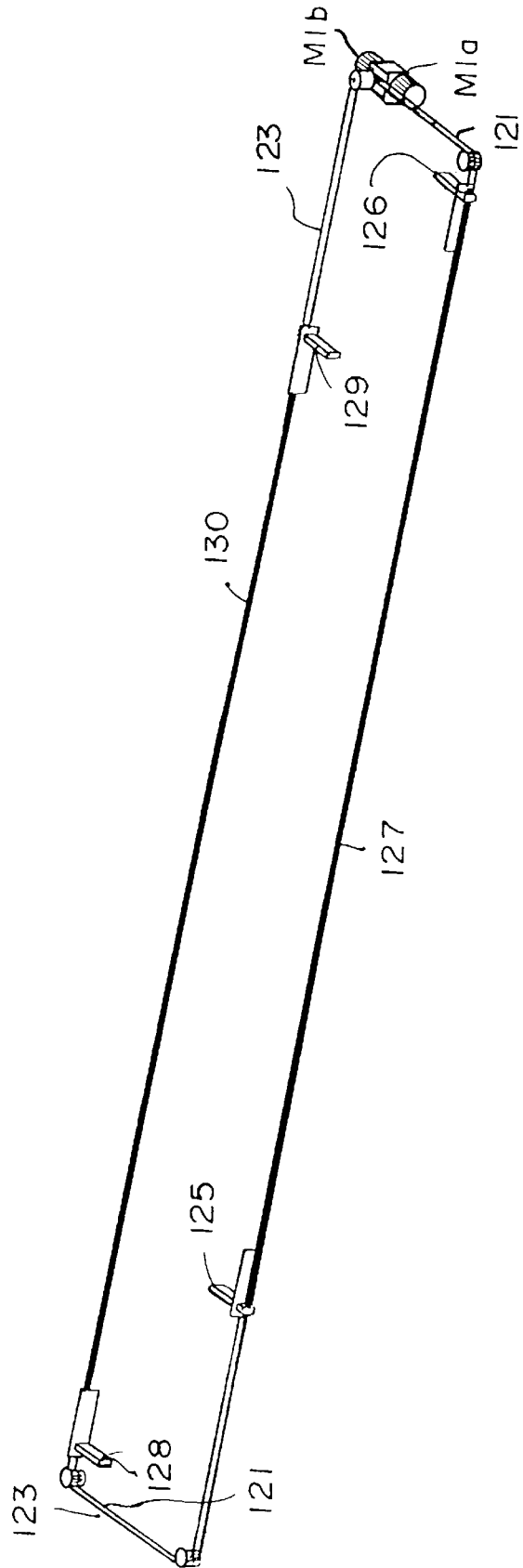
FIG. 9a more particularly illustrates the longitudinal transfer assembly in the system of FIG. 9.

The two longitudinal transfer assemblies, as more particularly illustrated in FIG. 9a, also include a pair of L-shaped retainer members 125, 126 at the opposite ends of a push-pull linear mechanical transmission device 127 on one side of the storage compartment, and a similar pair of L-shaped retainer members 128, 129 at the opposite ends of a push-pull linear mechanical transmission device 130 at the other side of the storage compartment. In this case, however, the two push-pull devices 127, 130 are connected to the common drive motor $M_{1a}$ (or $M_{1b}$) by a pair of cables 121, 123 at the opposite ends of the push-pull devices, to form a closed-loop with those devices, such that both push-pull devices are moved simultaneously equal amounts and in the opposite directions by the common drive motor.

One transverse transfer assembly driven by motor $M_{2a}$ (or $M_{2b}$) includes a carriage 131 carrying a pair of L-shaped retainer members (only one being shown in FIG. 9 at 133) on its opposite sides engageable with the opposite sides of the first container in one column; whereas the other transverse transfer assembly includes a carriage 134 carrying a pair of L-shaped retainer members 135, 136 at its opposite sides engageable with the opposite sides of the last container in the other column. In this case, the two carriages 131 and 134 are interconnected by a closed-loop cable, as shown at 138 in FIG. 9, so that both move equal amounts but in opposite directions by motor $M_{2a}$ (or $M_{2b}$).

Motor $M_{1a}$ (or its redundant motor $M_{1b}$) is operated to shift the carrier members, while suspended above the floor by rollers 106, 107, longitudinally to the ends of tracks 91–94. As described earlier, these tracks terminate short of the transverse floor sections 90a at each end of the compartment, wherein they are engaged by rollers 108 at the bottoms of the carrier members 100. Motor $M_{2a}$ (or its redundant motor $M_{2b}$) would be energized to effect the transverse shifting movement, at which time the rollers 108 at the bottoms of the carrier members move along the transverse sections 90a of the compartment floor.

Instead of providing the bottoms of the carrier members 100 with rollers 108 engageable with the transverse section 90a of the compartment floor, the bottoms of the carrier members may be provided with low-friction slide bars or strips of a low-friction plastic material (e.g., "Teflon", T.M.) engageable with the transverse sections 90a of the compartment floor to reduce the noise produced by this transverse movement. Such slide bars are shown at 108a in FIG. 13.

Figure 14:
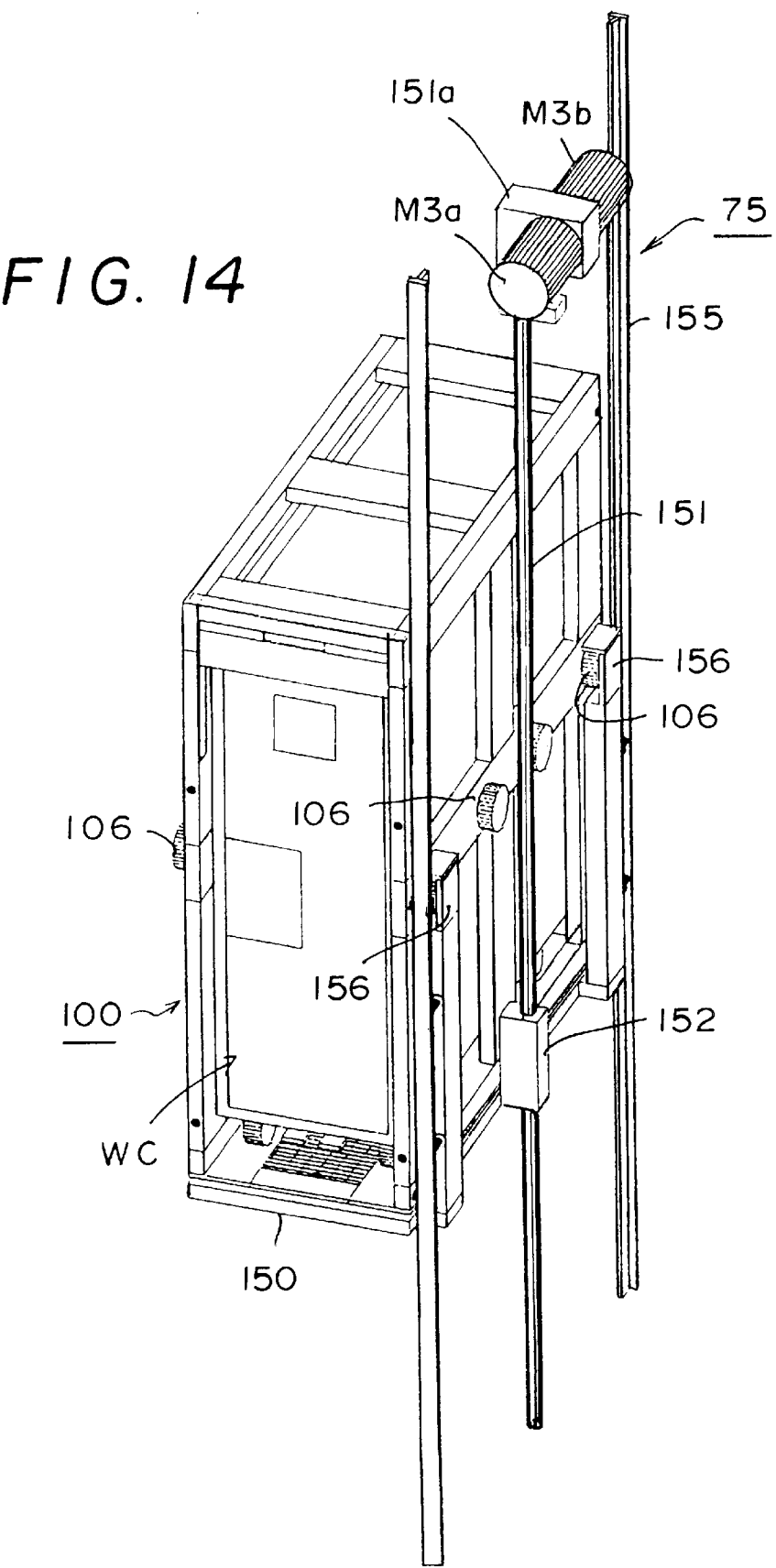
FIG. 14 is a three-dimensional view illustrating the lift in the storage system of FIG. 9.

FIG. 14 more particularly illustrates one of the lift assemblies 75 including its lift platform 150 for receiving a carrier member 100 loaded with a cart WC. The drive motors $M_{3a}$, $M_{3b}$ drive a screw 151 coupled to a nut 152 fixed to lift platform 150 to raise or lower the platform, and the article holder 100 thereon along vertical tracks 155. The lift assembly 75 further includes a pair of anchoring members 156 on opposite sides of the lift platform 150 in position to receive the two-end rollers 106 of a carrier member 100 to be transported by the lift assembly, such that the carrier member 100 is positively anchored to the lift platform 150 for movement thereby.

Figure 15:
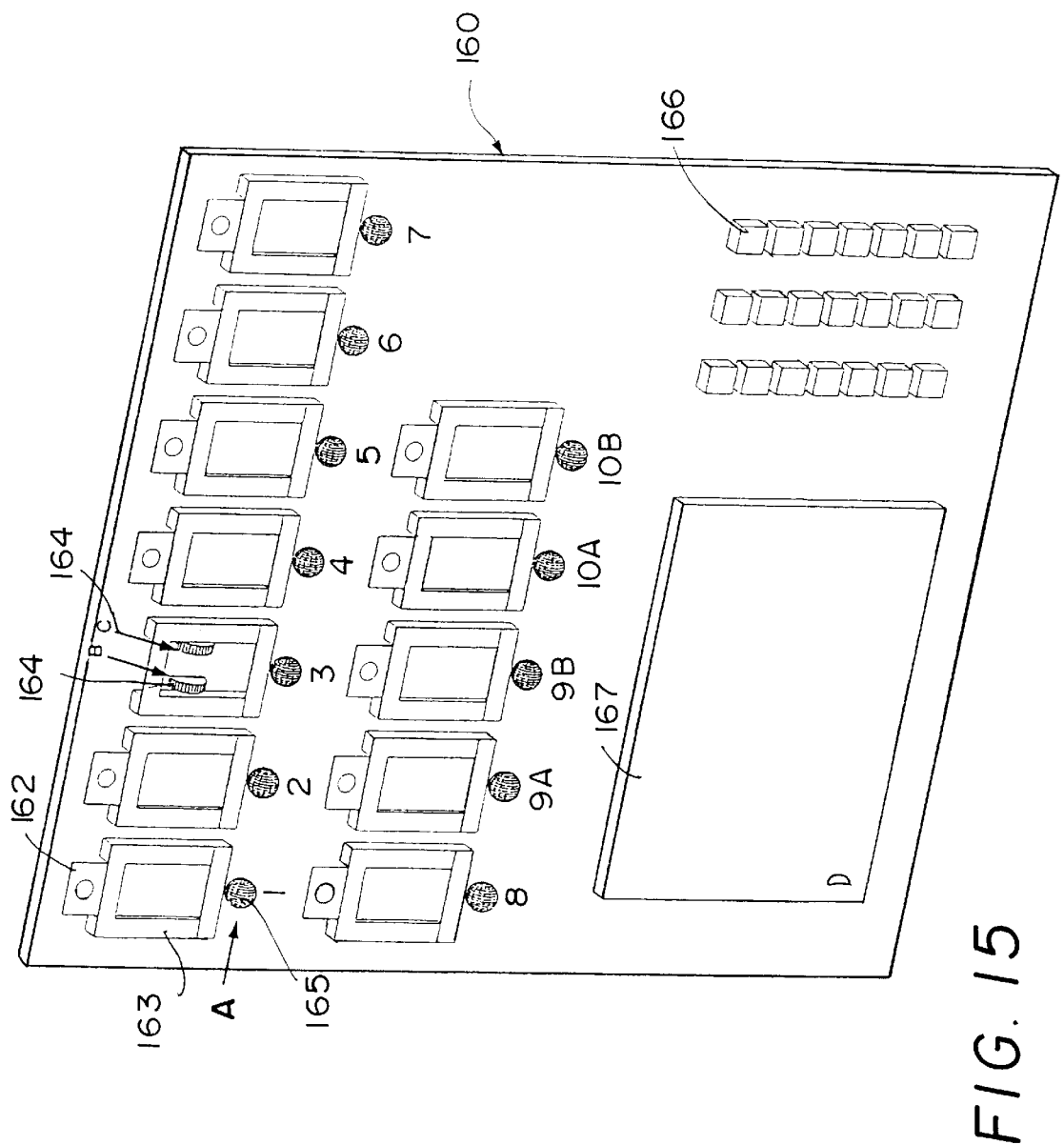
FIG. 15 illustrates a control panel in the storage system of FIG. 9.
Figure 16:
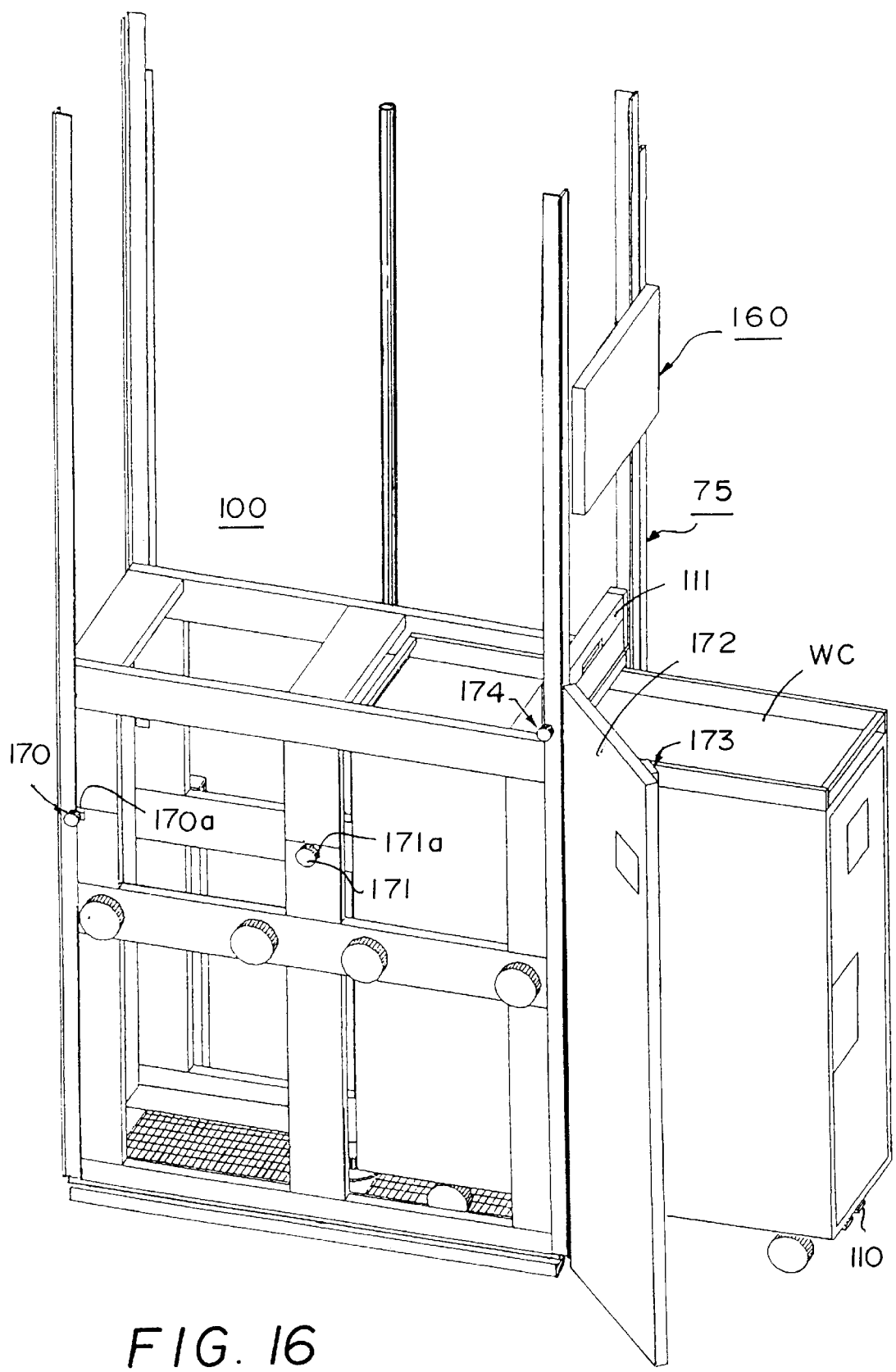
FIG. 16 illustrates a carrier member equipped with a plurality of sensors for better assuring proper operation of the system.

FIG. 15 illustrates a control panel, and FIG. 16 illustrates a number of sensors that may be included in the lift assembly 75 to better assure proper operation of the overall system.

The control panel 160 illustrated in FIG. 15 includes a display 167 for displaying the relative location of each carrier member in the system. Each cart to be stored in the system will have one designated storage location in one of the carrier members 100, in a similar manner as currently used in conventional galleys. The storage location and the cart contents will be indicated by identification cards 162. At least one such card 162 would be originally attached to each cart, but two would be preferred, both including the same information and having the same width. However, one card may be longer than the other to enable it to be more easily removed from the cart.

The control panel 160 illustrated in FIG. 15 includes a plurality of card holders 163 for receiving the removed identification cards in the proper location of each in the system. Each card holder 163 is provided with two micro-switches 164 (for redundancy purposes), to sense the presence of a card 162 in the respective card holder. Each card holder 163 further includes a light indicator 165 which is used to indicate to the ground and flight crews the proper location of the identification card which should be inserted.

As further shown in FIG. 15, control panel 160 further includes a keyboard (60, FIG. 7) containing a plurality of keys 166 used for introducing data into the computer (61, FIG. 7). The input data would include operation commands, the contents of the carts, and any other desired information. This inputted data enables the computer to continuously track the exact contents of each carrier member in each cart. The monitor (63, FIG. 7) may also include a touch panel 167 which may also be used to input data, particularly operational commands and data regarding locating and retrieving carrier members 100, in addition, to or lieu of the keys 166 of the keyboard.

Control panel 160 is preferably located on the forward wall of the lift assembly 75, as shown in FIG. 16. The lift assembly also includes a plurality of sensors for automatically sensing the various conditions concerning the carrier member 100 loaded onto the lift assembly to assure that everything is in order before the lift assembly can be actuated.

Thus, as shown in FIG. 16, the lift assembly 75 includes two optical sensors 170, 171 for sensing the presence of a wheeled cart WC, or two half-carts, within the respective carrier member. The lift assembly 73 further includes a pivotal door 172 having an electro-mechanical lock 173, and a sensor 174 to sense that slidable lock 111 of the carrier member loaded on the lift assembly is closed before the lift assembly can be operated.

Thus the lift assembly 75 cannot be operated unless: (1) the carrier member 100 on it is either fully empty, or is fully occupied by one full cart WC or two half carts WC', as sensed by sensors 170, 171; (2) and slidable lock 111 is in its down (closed) position, as sensed by sensor 174; (3) electromechanical lock 173 is closed; and (4) and identification card 162 is in the proper card holder 163 (FIG. 15) as sensed by a micro switch 164.

The cards 162 keep the crew informed where each cart is located to prevent a multifunction in the operation of the system. Thus, as indicated earlier, each cart is preferably supplied with two cards 162, as shown in FIG. 10. When a cart is placed in a carrier member 100, one of the cards 162 is removed from the cart and placed into the respective card holder 163 on the control panel 160. Whenever one of the carrier members 100 is retrieved from the upper galley, the respective lamp 165 of that carrier member on the control panel 160 flickers to indicate this fact to the crew. The insertion of a card 162 into the respective holder 163 is sensed by the micro-switches 164.

Before the carts are loaded into the carrier members, all the cards 162 will be on the carts, and none will be in the card holders 163 of the control panel 160. As each carrier member is brought by the lift assembly 75 to a loading position, the computer 61 (FIG. 7) displays on monitor 63 a message directing the user to remove one of the cards 162 from the respective cart and to place it into the card holder 163 of the appropriate carrier member 100, and the lamp 165 on control panel 160 for the respective carrier member will flicker. As noted above, the computer continuously tracks all movements of the carrier members 100 so that it knows which carrier member is in the lift position for loading or unloading the respective cart or carts.

When the card 162 for the respective cart is placed into holder 163 of the correct carrier member 100, lamp 165 for the respective cart will cease to flicker. If the card 162 is placed into the wrong card holder 163, the computer will prevent operation of the lift, and will also cause a message to be displayed on the monitor informing the user of this and directing the user to place the card in the proper card holder.

As indicated earlier, the lift is also disabled from operation if it is determined by sensors 170, 171 that the carrier member in loading/unloading position on the lift assembly is not completely empty or completely full (i.e., including either one complete cart or two half carts), or if sensor 174 determines that the slidable lock 111 of the carrier member on the lift assembly is not closed, or lock 173 on the pivotal door 172 is not closed.

In all other respects, the construction of the storage and retrieval system illustrated in FIGS. 8–16 may be substantially the same, and operated in substantially the same manner, as described above with respect to FIGS. 1–7.

A LOWER GALLEY EMBODIMENT

FIGS. 17–24 illustrate a lower galley embodiment of the present invention in which the apparatus for compactly storing and retrieving article holders is incorporated in a lower cargo hold of the aircraft. This embodiment also shows how the apparatus may be conveniently expanded to multiply the storage capacity of the apparatus by merely adding one or more additional modules, each for storing a plurality of the article holders in the form of a matrix as described earlier.

Figure 17:
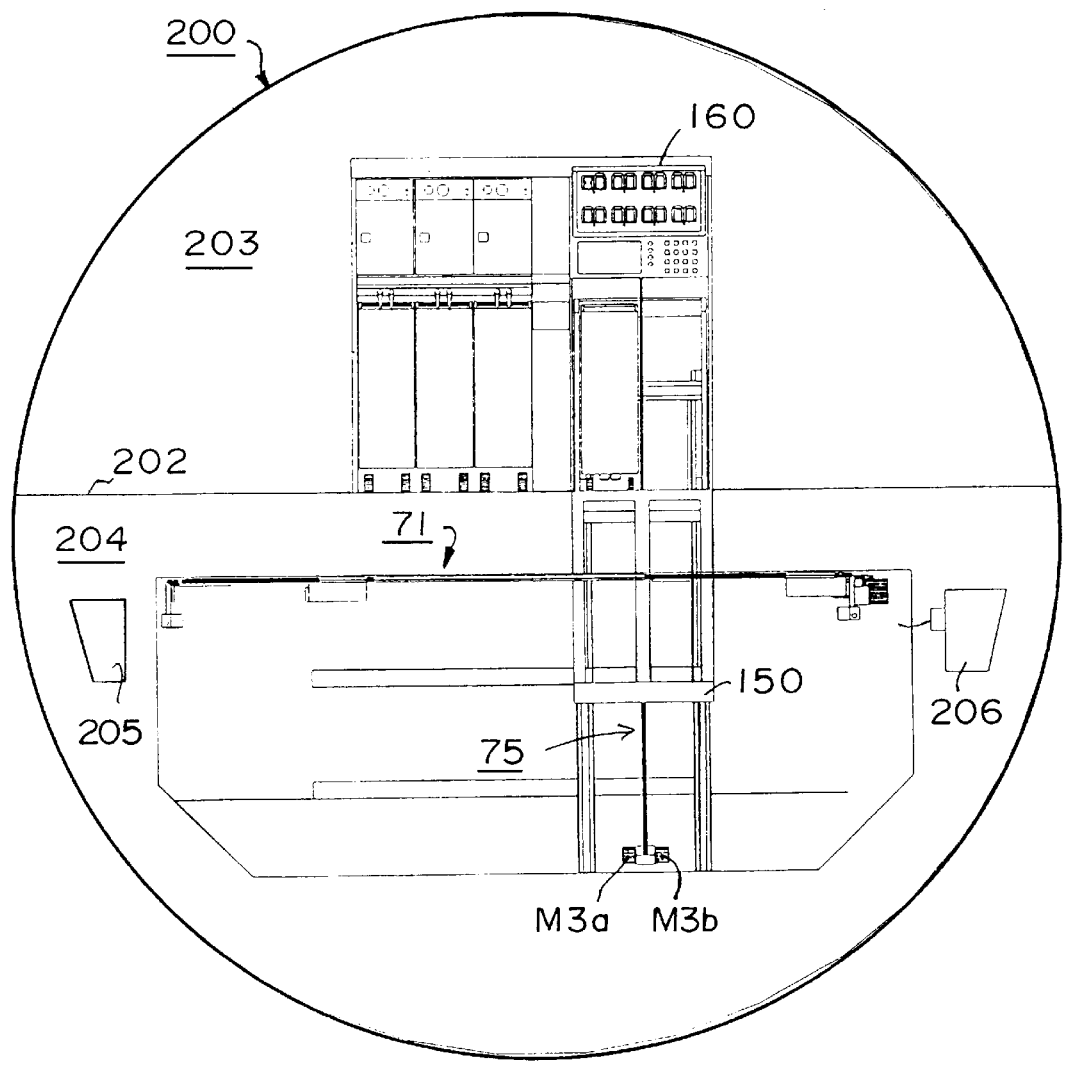
FIG. 17 illustrates an aircraft lower galley incorporating apparatus constructed in accordance with the present invention.

The lower galley embodiment of the invention is generally designated 200 in FIG. 17. The section of the aircraft illustrated in FIG. 17 may be, for example, the forward side of the aft lower cargo hold, or the aft side of the forward lower cargo hold. The main deck 202 divides this section of the aircraft into the upper passenger compartment 203, and the lower cargo compartment 204. The storage apparatus 71 is included within the lower cargo holder 204. It compactly stores a plurality of carrier members 100, which may be as described in the earlier embodiments, each for receiving one or more carts WC, food containers FC, or the like. Lift assembly 75 stores and retrieves the carrier members 100 between the cargo hold 204 and the passenger compartment 203 all under the control of control panel 160 in the passenger compartment. The cargo hold 204 includes an air cooler 205 for cooling the food containers within the storage system, and an electrical junction box 206 for plugging the electrical system of the storage apparatus into the aircraft electrical and command system.

The longitudinal and transverse transfer assemblies for shifting the carrier members 100 may be the same as described above particularly with respect to FIG. 6. However, in order to reduce the shifting time to provide access to a selected carrier member, the operations of the longitudinal and transverse transfer assemblies overlap each other to a considerable extent so that there is concurrent operation of both assemblies for a considerable portion of each operational period.

FIGS. 18a–18g illustrate the operations of the longitudinal and transverse transfer assemblies, and correspond generally to FIGS. 6a–6g described above. In the arrangement of FIGS. 18a–18g, however, the operation of the transverse transfer assembly is substantially continuous through the stages illustrated in FIGS. 18a–18d, whereupon the longitudinal transfer assemblies are operated substantially continuously as shown in FIGS. 18d–18g. In addition, a substantial portion of the operation of one transfer assembly occurs concurrently with the operation of the other transfer assembly, thereby minimizing the time required for a complete operational cycle.

FIGS. 18a–18g illustrate the various stages in a complete operational cycle corresponding to those illustrated in FIGS. 6a–6g but modified to show the concurrent movement of both transfer assemblies during portions of a complete operational cycle. Whereas FIGS. 6a–6g illustrate a matrix of 7×7 containers or carrier members (12a–12n), FIGS. 18a–18g illustrate a matrix of 4×4 containers or carrier members (100a–100h) merely for purposes of example.

Thus, assuming that the carrier members are in the initial positions illustrated in FIG. 18a, the transverse retainers 32, 33 and 35, 36 are operated to start the transverse shift the two end carrier members 100a, 100h. As soon as the two end carrier members 100a, 100h have been moved transversely sufficiently so as to be out of alignment with the longitudinal retainer members 25 and 29, and the right corner of carrier member 100a has passed the left corner of carrier member 100e, the longitudinal retainer members are operated (FIG. 18b) so as to reach their end positions just before the transverse retainer members have completed the transverse shift of carrier members 100a, 100h (FIG. 18c) to enable the latter carrier members to complete their transverse movements (FIG. 18d). As soon as the longitudinal retainer members have moved sufficiently, the transverse retainer members 32, 33 and 35, 36 begin their movements (FIG. 18e). The movement of the transverse retainer members is completed (FIG. 18f) just before the longitudinal shift of the carrier members has been completed (FIG. 18g).

It will be seen that the shifting of the carrier members in FIGS. 18a–18g also assures that all the carrier members are secured against any movements other than those produced by the transfer assemblies, as in the earlier described embodiments.

Figure 19:
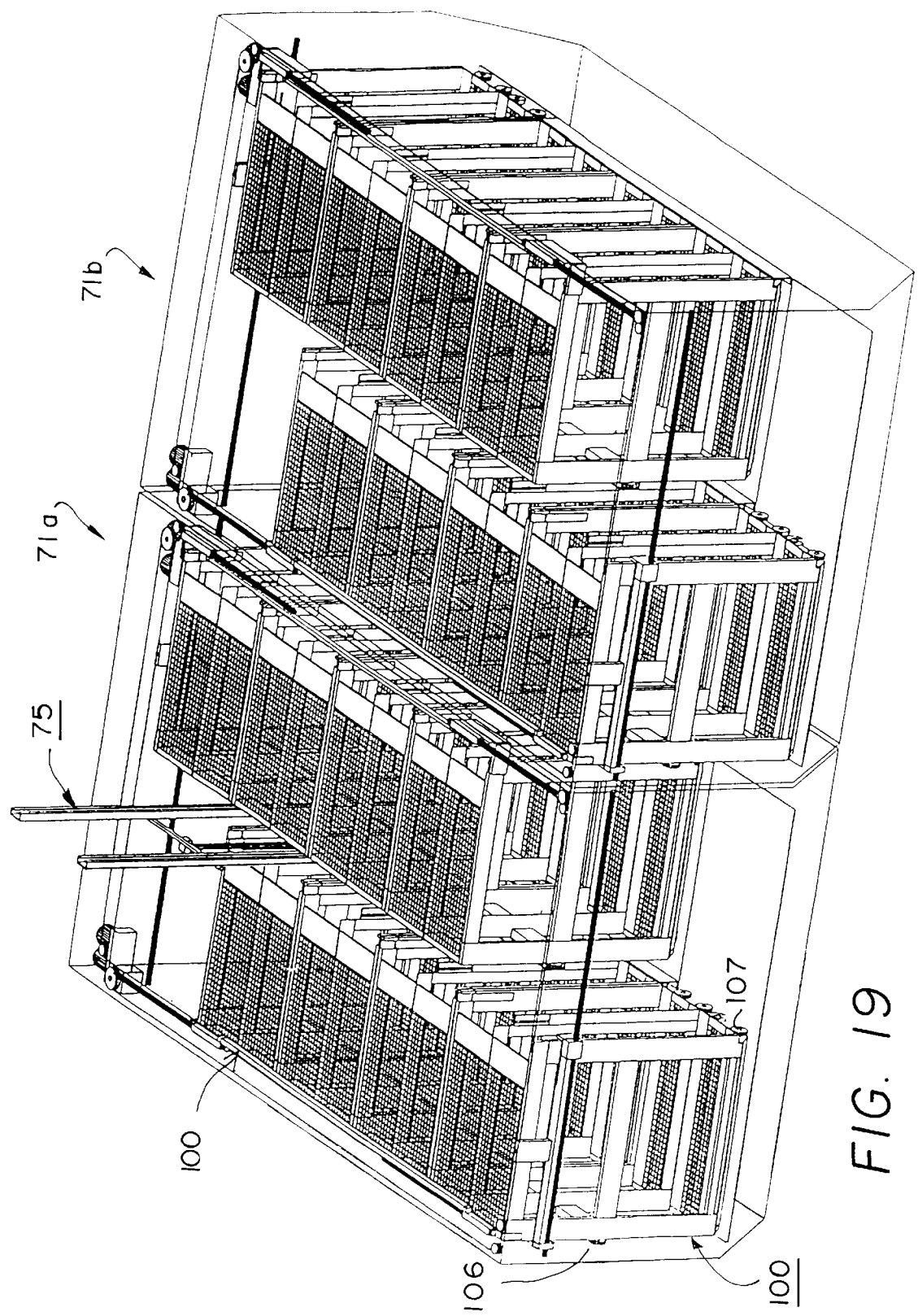
FIG. 19 illustrates one manner, in the form of a duplex system, showing how the apparatus may be expanded to multiply the number of article holders than can be accommodated.

FIG. 19 illustrates the manner in which one storing apparatus may be constructed as modular units and the overall system expanded by using a plurality of such modular units. For purposes of example, FIG. 19 illustrates a duplex system constituted of two such modular units 71a, 71b. Each including a matrix of 7×7 carrier members 100. Unit 71a serves as a primary unit and includes the lift apparatus 75 for lifting selected carrier members 100 to or from the passenger compartment 203. Lift 75 in the primary unit 71a also serves to lift the carrier members in the secondary unit 71b, as will be described below particularly with reference to FIGS. 20a, 20b and 21.

To facilitate shifting movement between the two modular units 71a, 71b, the rollers 106 on one side of the carrier members 100 are midway of the height of the carrier member as described above, but the rollers 107 on the opposite side are at the bottoms of the carrier members, as shown in FIG. 19. Thus, the tracks for receiving the bottom rollers 107 will also be at the bottom of the compartment, and therefore will not interfere with the transfer of a carrier member from modular unit to the other and during loading and unloading via the lift 75.

Figures 20A, 20B:
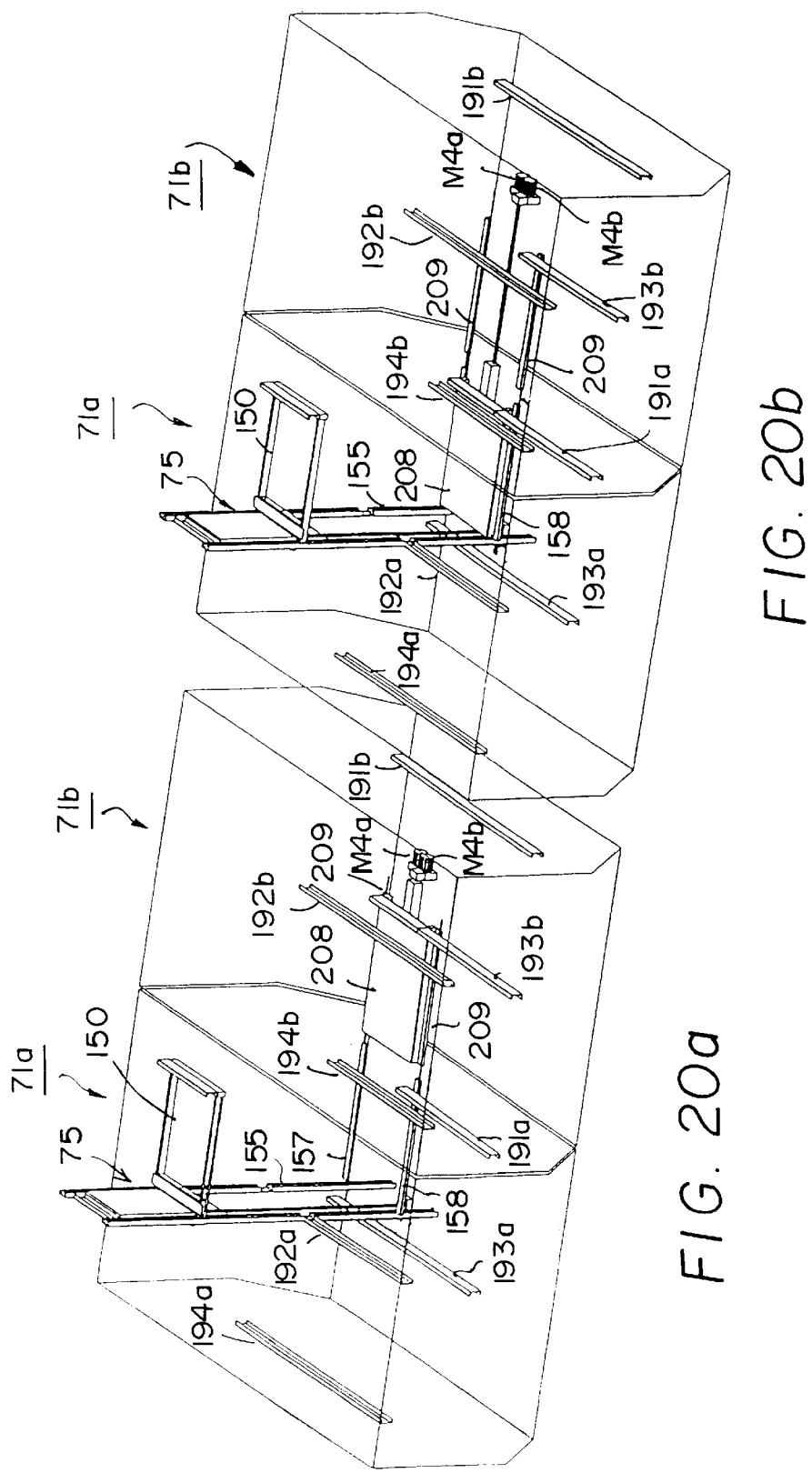
FIGS. 20a and 20b diagrammatically illustrate the transverse movement between one matrix and the other matrix in the duplex system of FIG. 19.

As shown in FIGS. 20a, 20b, each of the two modular units 71a, 71b, includes the four longitudinally-extending tracks 191a–194a and 191b–194b corresponding to tracks 91–94 in FIG. 11, except that the tracks 191a, 193a and 191b, 193b, for receiving rollers 107, are located at the bottoms of the respective compartments, rather than at an immediate-height location of the compartment.

The lift assembly 75 is similar to that illustrated in FIG. 14 for the upper galley embodiment and is located within modular unit 71a. The matrices of the two modular units 71a, 71b are aligned, such that the position of lift platform 150 in unit 71a is also aligned with one of the matrix positions in unit 71b. This matrix position is occupied by a transfer platform 208 which may be shifted horizontally by electrical motor $M_{4a}$ (or redundant motor $M_{4b}$) along horizontal rails 209, to transfer a carrier member from one modular unit to the other.

FIG. 20a, illustrates the transfer platform 208 within modular unit 71b for receiving a carrier member 100, and FIG. 20b illustrates the transfer platform 208 shifted to modular unit 71a in order to permit a carrier member 100 in modular unit 71b to be transferred to modular unit 71a.

Figure 21:
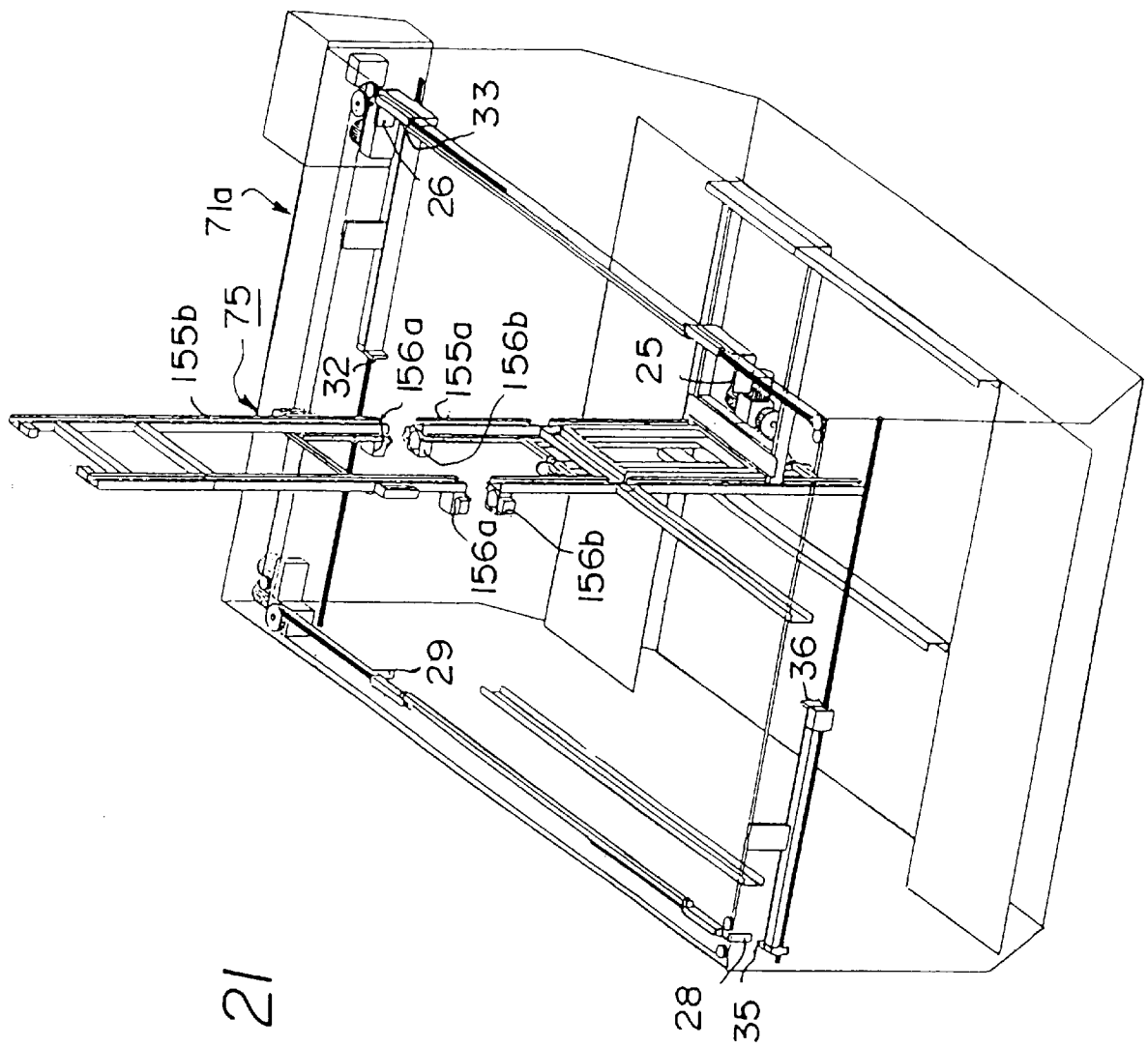
FIG. 21 illustrates a variation wherein the article holders are contained in a standard-sized cargo container for quick loading and unloading.

FIG. 21 more particularly shows the construction of the primary modular unit 71a. This modular unit is constructed in the form of a standard-sized cargo container for quick loading and unloading. It includes the earlier-described longitudinal and transverse transfer assemblies and lift assembly 75, to provide access to selected carrier members (e.g., 100). In order to facilitate understanding, the longitudinal retainer members in the longitudinal transfer assembly have been identified by the same reference numerals 25, 26 and 28, 29, as described above with respect to FIGS. 2–6; and similarly the transverse retainer members in the transverse transfer assembly have been identified by the same reference numerals 32, 33 and 35, 36.

The lift assembly 75 for the standard sized cargo container 71a illustrated in FIG. 21 includes two rail sections, namely rails 155a provided in the standard-sized cargo container itself, and rails 155b provided in the aircraft. The two sections include telescoping quick-connectors 156a and 156b, respectively, to permit quick attachment or detachment of the two rails sections when the cargo container module is to be applied or removed from the aircraft.

Figure 22:
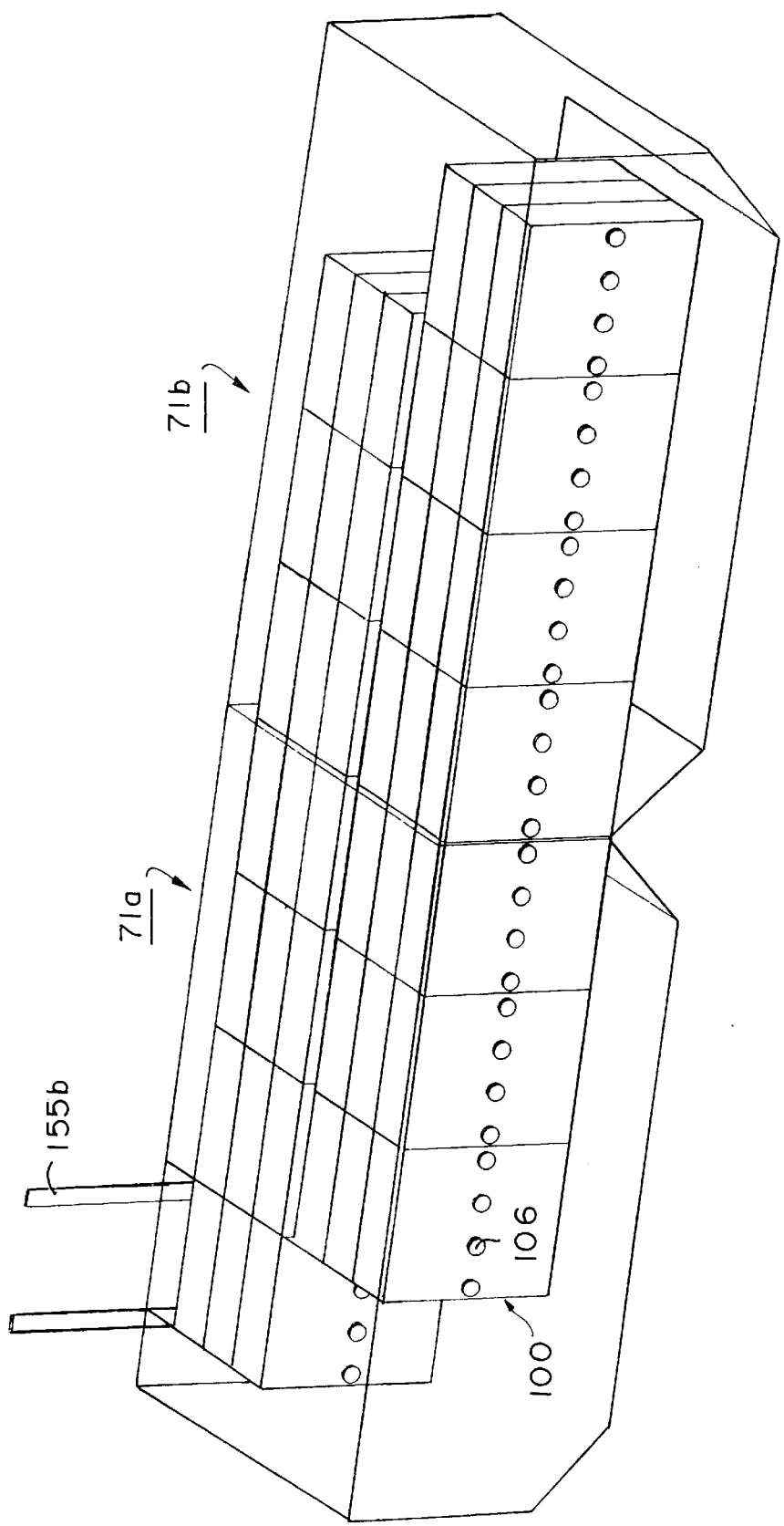
FIG. 22 diagrammatically illustrates an arrangement including two standard cargo containers, each including seven carrier members, with each carrier member adapted to accommodate three article holders, such as three carts, containers, etc.

FIG. 22 diagrammatically illustrates two such cargo-container modules 71a, 71b connected together at their narrow side, e.g., by any suitable quick-connector. Only one of the modular units 71a includes the lift assembly 75 connectable to the aircraft rail section 155b. When two such units are used together as illustrated in FIG. 22, their carrier members 100 are handled as a single matrix. Therefore, in the example illustrated in FIG. 22, each unit 71a, 71b includes seven carrier members 100 such that both units together define a matrix of fourteen carrier members, arranged in two columns and handled as described above. For purposes of example, each carrier member is shown in FIG. 22 as accommodating three article holders, such as carts WC, half-carts WC', or containers FC.

Figure 23:
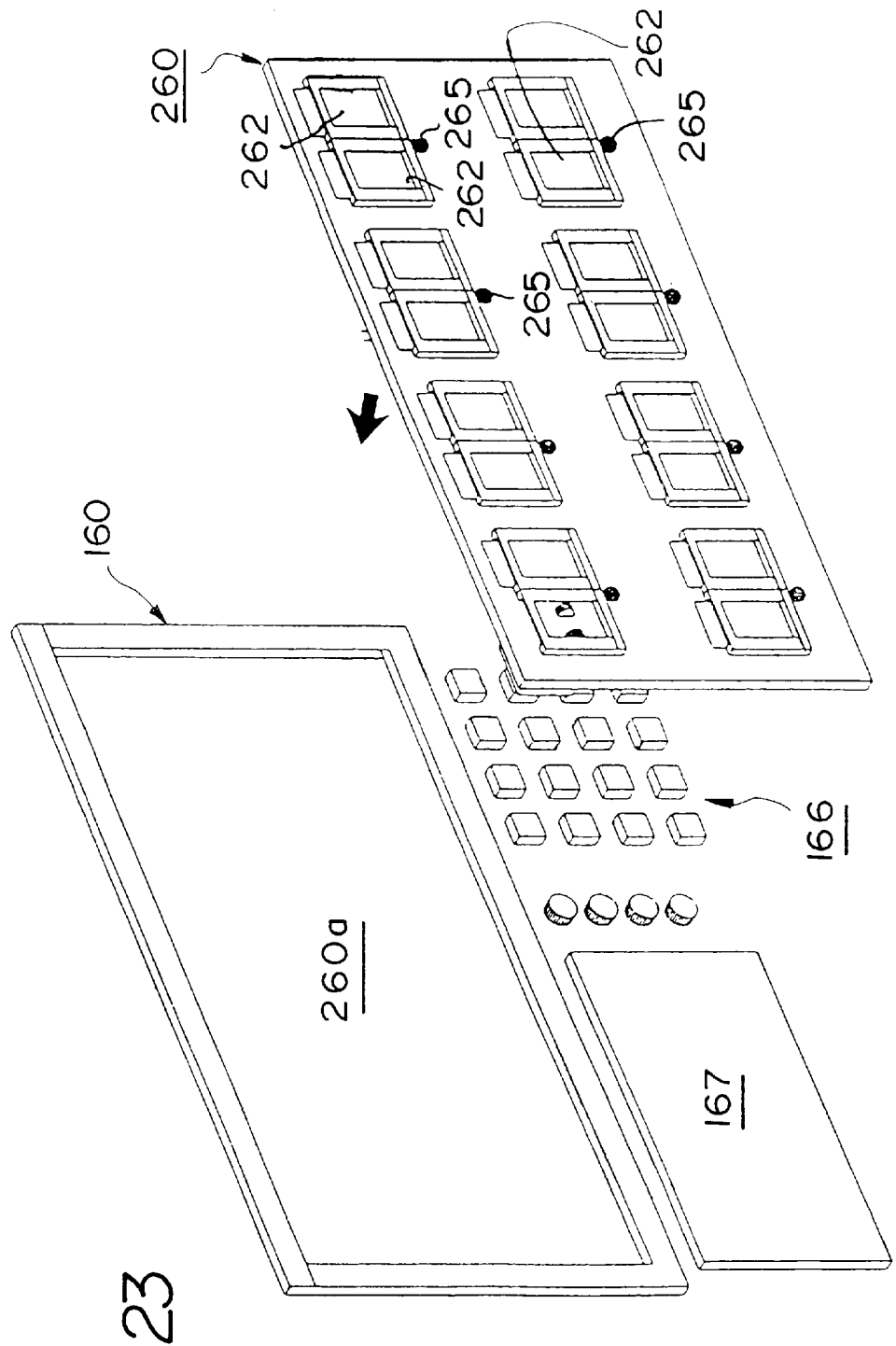
FIG. 23 illustrates a control panel which may be used when using the standard-sized cargo container for quick loading/unloading.
Figure 24:
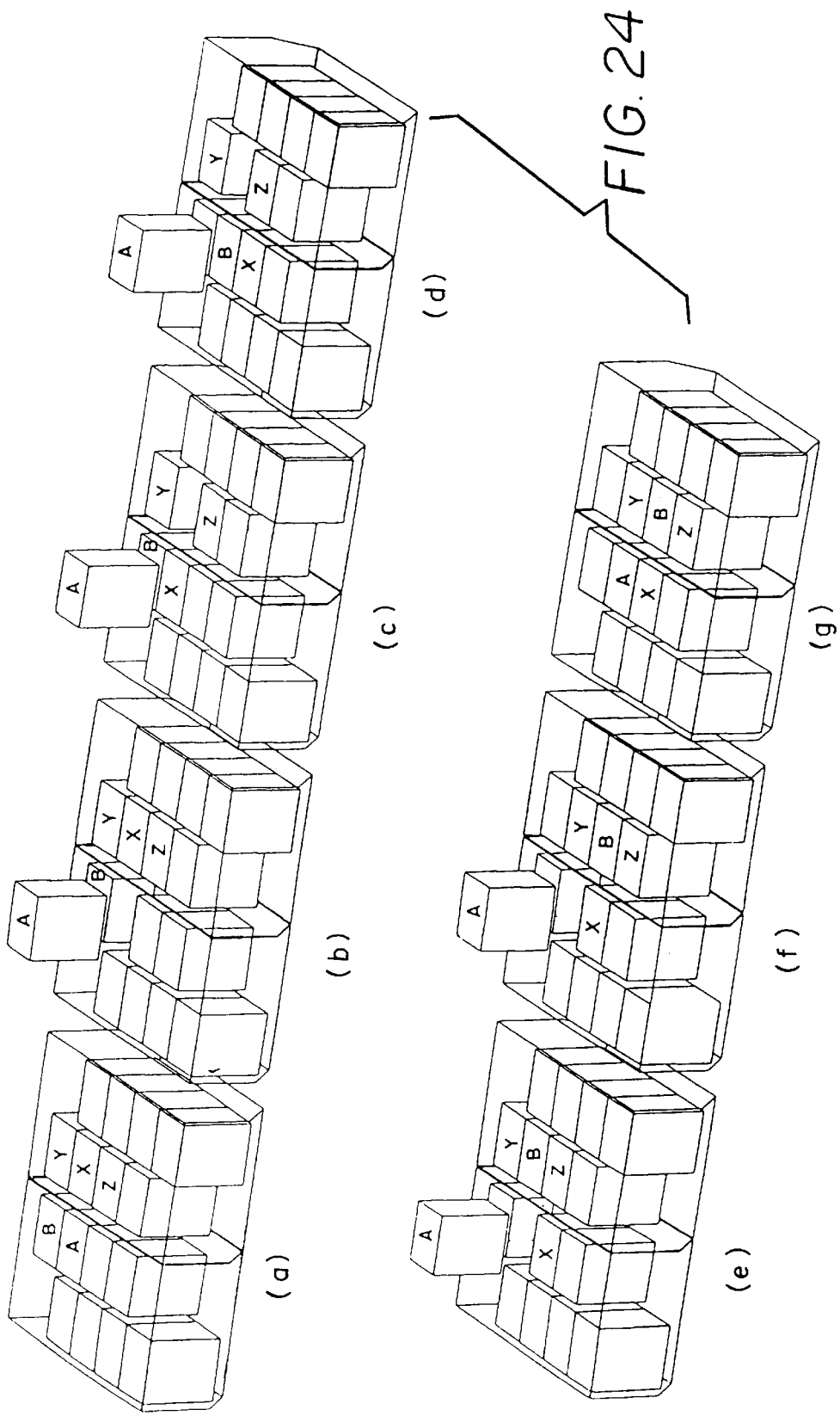
FIG. 24 illustrates the various stages in the transfer of an article holder from one matrix to another matrix in the duplex system of FIG. 19.

FIG. 23 illustrates a control panel which may be provided on the aircraft to enable the aircraft also to produce a quick change of standard-sized cargo containers such as described above with respect to FIGS. 21 and 22. Thus, when a standard-size cargo container is to be replaced by a new container containing a fresh matrix of carrier members, the new cargo container may be provided with a unitary identification-card holder panel, generally designated 260 in FIG. 23, containing the identification cards 262 of all the carts or other article holders included in the carrier members and the indicator lamps 265, etc. thereof. Panel 260 is removable as a unit for insertion into a card-holder section 260a of control panel 160 described above with respect to FIG. 15. Such an arrangement thereby enables not only quick loading/unloading of carrier members by the use of standard-sized cargo containers, but also facilitates quick loading/unloading of the identification cards and indicator lamps relating to the carts in the cargo container FIG. 24 illustrates the various stages in transferring a carrier member 100 from the primary modular unit 71a to the secondary modular unit 71b. In this example, carrier member B of the primary modular unit 71a is to be transferred to the secondary modular unit 71b; and carrier member X of the secondary modular unit 71b is to be transferred to the primary modular unit 71a.

Thus, as shown in FIG. 24, carrier member A, initially in modular unit 71a (step a), is lifted by lift 75 above the two matrices (step b); carrier member x is shifted by transfer platform 208 from modular unit 71b to the vacant space thus formed in modular unit 71a (step c); the primary unit 71a performs one clockwise shifting operation (step d); transfer platform 208 then shifts carrier member B from unit 71a to unit 71b (step e); the secondary unit 71b then performs one counter-clockwise shifting operation (step f); and finally carrier member A is returned by lift 75 to modular unit 71a (step g).

CLEANING MODULE

Figure 25:
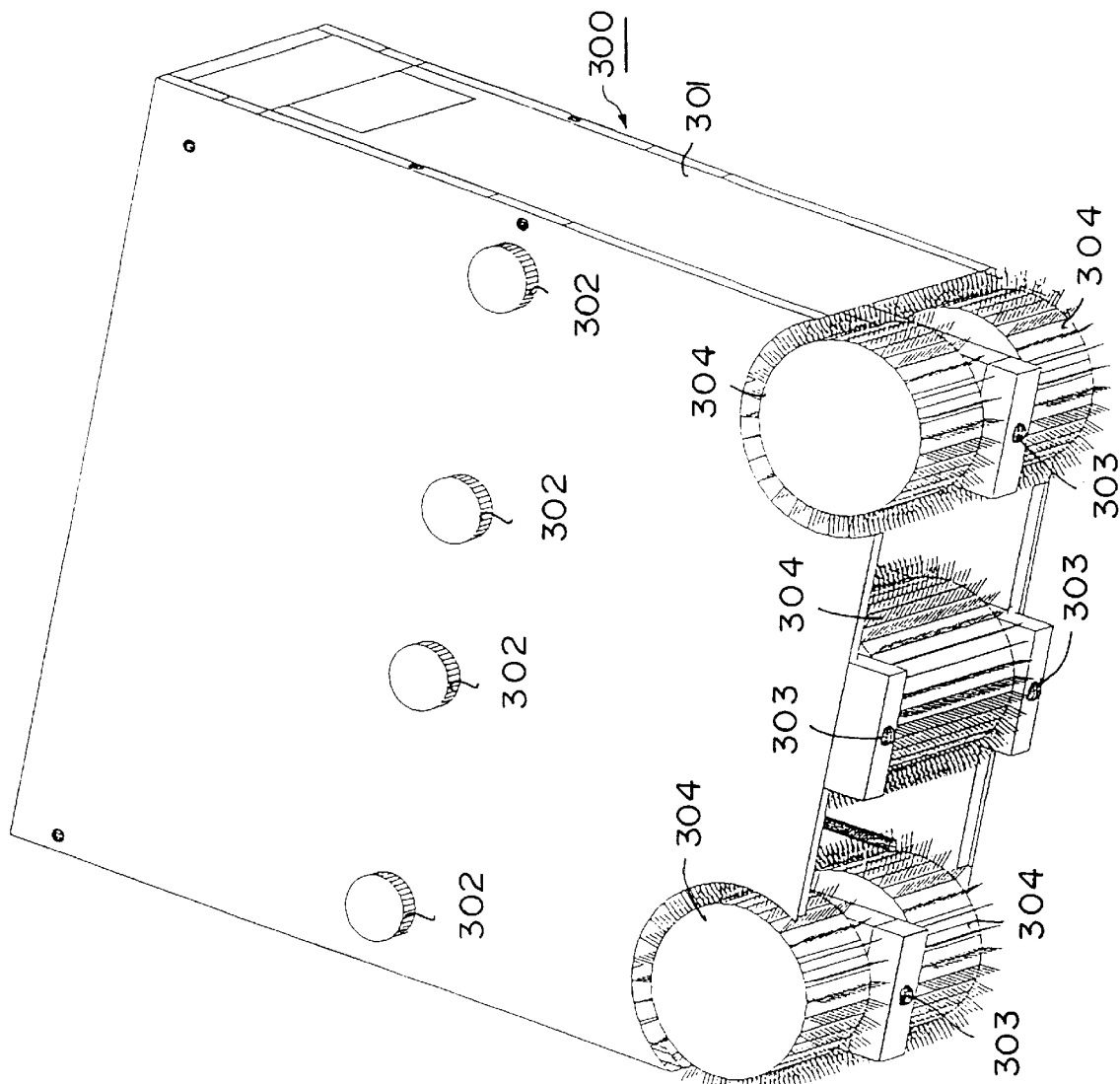
FIG. 25 illustrates a cleaning module that may be used in any of the described systems for cleaning purposes.
Figure 26:
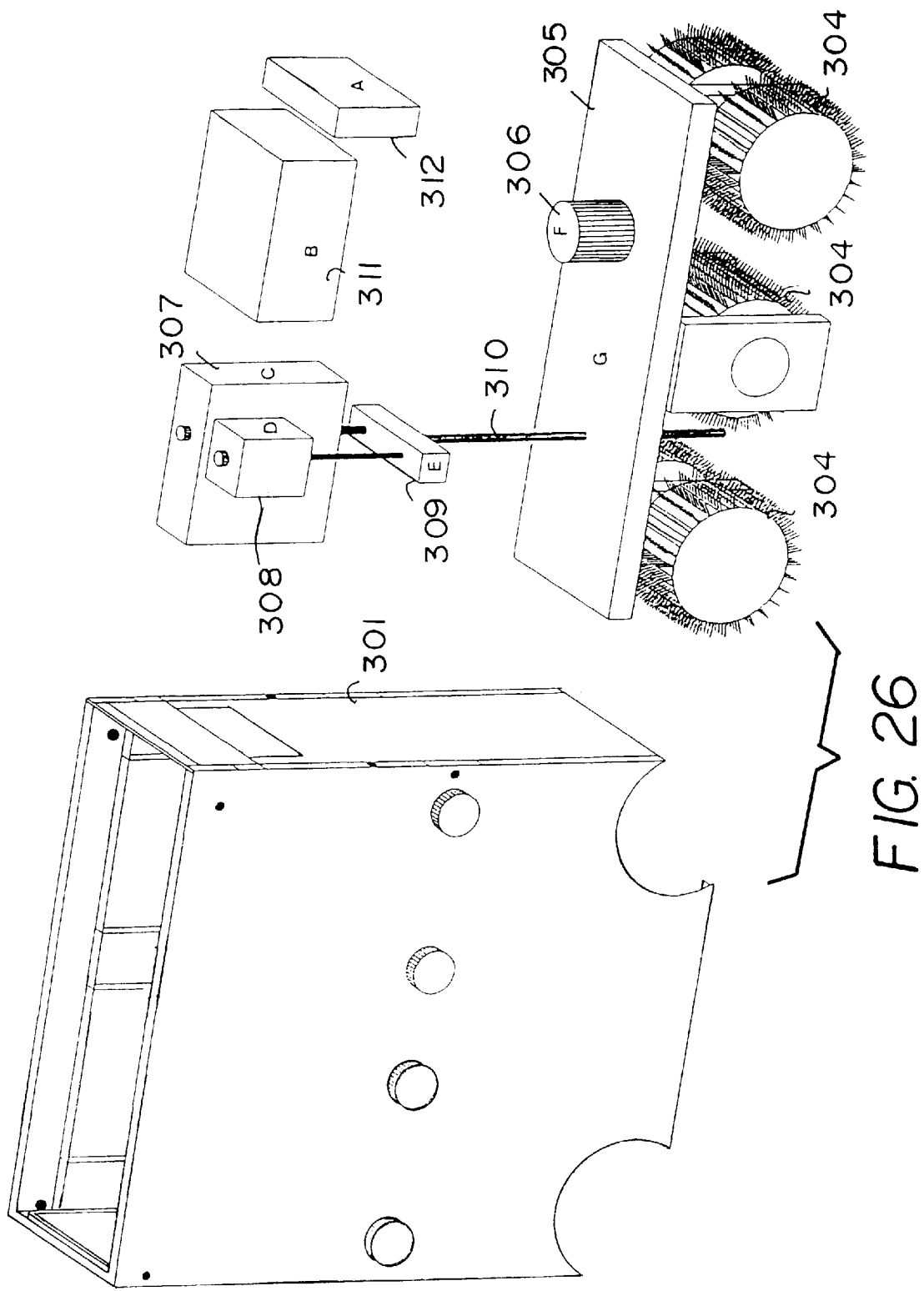
FIG. 26 is a an exploded view diagrammatically illustrating the construction of the cleaning module of FIG. 25.

FIGS. 25 and 26 illustrate a cleaning module, generally designated 300, which may be temporarily included in any of the systems described above and substituted for one of the article holders in order to facilitate cleaning the system.

Cleaning module 300 includes a housing 301 of the same external dimensions as the carrier members 100. It has, on each of its two opposite sides, a horizontal line of rollers 302 receivable within the horizontal tracks (e.g., 91–94) of the storage compartment frame members for supporting the cleaning module while permitting its longitudinal movement within the storage compartment. If the cleaning model is for use in the duplex system of FIG. 19, one line of rollers would be midway of the height of housing 301, the other line would be at the bottom of the housing and the housing would be wider.

Cleaning module 300 further includes a plurality of spherical rollers 303 projecting from its base. These rollers correspond to spherical rollers 108 of the carrier member 100 for the article holders and are also engageable with the storage compartment floor during the transverse movement of the cleaning module. Instead of rollers 108, the housing could be provided with non-friction slide bars corresponding to slide bars 108a in FIG. 13.

Cleaning module 300 further includes a plurality of rotary brushes 304 supported on a mounting plate 305 (FIG. 23). Brushes 304 project below the lower surface of the cleaning module to engage the storage compartment floor 90, 90a during the longitudinal and transverse movements of the cleaning module. As shown diagrammatically in FIG. 23, brushes 304 are driven by a motor 306; and a water container 307 and detergent container 308 feed water and detergent to a mixer compartment 309, where they are mixed before being fed via a feed tube 310 to the storage compartment floor to be cleaned by brushes 304. Motor 307, which rotates brushes 304 is powered by a battery 311 and is under the control of a control panel 312.

It will thus be seen that whenever the storage compartment is to be cleaned (while the aircraft is on the ground), a cleaning module 300 maybe substituted for one of the article holders and moved both longitudinally and transversely, by operating the longitudinal and transverse transfer assemblies in the normal manner. The carrier members 100, including their rollers, may be individually removed from the storage compartment by the lift for cleaning and for normal maintenance purposes.

The systems illustrated in the drawings are particularly useful for aircraft since they efficiently utilize the floor space within the aircraft and provide flexibility in the galley floor locations. Moreover, the described systems are relatively maintenance free since they permit convenient cleaning of the storage compartments, the carrier members, and the rollers used for shifting the article holders stored within this compartment. In addition, the described systems permit individual removal of carrier members for maintenance purposes, substantially reduce friction during the shifting of the carrier members, and also reduce noise to the passengers, or distance the noise from the passengers.

While the invention has been described with respect to several preferred embodiments, it will be appreciated that these are set forth merely for purposes of example, and that many variations may be made. For example, the illustrated systems may be used for storing and retrieving other types of devices or article holders, e.g., pallets supporting stacks of containers. In addition, the apparatus could be used in other environments, for example for storing articles in a warehouse. Further, other drives could be used, such as hydraulic drives; and other transmissions could be used, for example gear transmissions. Many other variations and applications of the invention will be apparent.

What is claimed is:

1. Apparatus for compactly storing and retrieving a plurality of movable devices of the same size and external configuration each including opposed longitudinal sides and opposed transverse sides, comprising:

a support for horizontally supporting said plurality of movable devices in the form of at least one two-dimensional matrix constituted of two columns and a plurality of rows of two devices in each row, with each device in abutting relation with the adjacent devices on its opposite longitudinal sides, and with a vacant space for one device in the first and last rows of the matrix;

two longitudinal transfer assemblies, one for each of said columns, each assembly including a pair of L-shaped retainer members engageable with the outer corners of the first device and the last device in the respective column;

two transverse transfer assemblies, one for the first row of the matrix and the other for the last row of the matrix, each transverse transfer assembly including a pair of L-shaped retainer members engageable with the outer corners of the device in the first row and the device in the last row, respectively;

a longitudinal drive for driving, in opposite longitudinal directions, said two longitudinal transfer assemblies and the devices in their respective columns while the longitudinal sides of the devices are maintained in said abutting relation by the pair of retainer members in each of the two longitudinal transfer assemblies;

and a transverse drive for driving, in opposite transverse directions, said two transverse transfer assemblies and the devices in their respective first and last rows while the longitudinal sides of the devices in said first and last rows are maintained in abutting relation with the longitudinal sides of the devices in the adjacent rows, such that all said devices are always secured against any movement other than that produced by said transfer assemblies.

2. The apparatus according to claim 1, wherein said longitudinal drive includes a common longitudinal drive motor for driving both of said longitudinal transfer assemblies simultaneously the same amount in opposite longitudinal directions.

3. The apparatus according to claim 1, wherein said transverse drive comprises a common transverse drive motor for driving both of said transverse transfer assemblies simultaneously the same amount in opposite transverse directions.

4. The apparatus according to claim 3, wherein said common transverse drive further comprises a transverse screw for driving the two retainer members in one transverse transfer assembly, and a closed loop belt connecting said one transverse transfer assembly with the other transverse transfer assembly for simultaneously driving the latter assembly, and the two retainer members thereof, in the other transverse direction.

5. The apparatus according to claim 4, wherein the two retainer members in each transverse transfer assembly are carried by a common carriage coupled to said closed loop belt.

6. The apparatus according to claim 1, wherein said support is a floor formed with an opening of slightly larger size than the size of one of said movable devices; and said apparatus further comprises a lift assembly including a horizontal platform of the same size and configuration as said opening in the horizontal floor, and a vertical drive for driving said platform to a position flush with said floor to receive one of said devices, or to another position vertically spaced from said floor to transfer the received device to another vertical level.

7. The apparatus according to claim 1, wherein said movable devices are supported on a horizontal floor by rollers shiftable in two dimensions.

8. The apparatus according to claim 1, wherein said movable devices are carrier members supported in suspension by a line of rollers on each of the opposite transverse sides of each carrier member received within longitudinally-extending tracks.

9. The apparatus according to claim 8, wherein said carrier members are supported for transverse movement over a horizontal floor by rollers carried by the carrier members and rollable along the floor.

10. The apparatus according to claim 8, wherein said carrier members are supported for transverse movement over a horizontal floor by low-friction slide bars secured to the bottoms of the carrier members and slidably engageable with underlying sections of the floor.

11. The apparatus according to claim 1, wherein a substantial portion of the operation of the longitudinal drive for driving the longitudinal transfer assemblies occurs concurrently with the operation of the transverse drive for driving the transverse transfer assemblies, thereby minimizing the time required for a complete operational cycle.

12. The apparatus according to claim 1, wherein said plurality of movable devices are stored in a plurality of said matrices, each matrix including two of said longitudinal transfer assemblies, two of said transverse transfer assemblies, a said longitudinal drive, and a said transverse drive; at least one movable device position in one matrix being aligned with a movable device position in the other matrix to permit transfer of a movable device from one matrix to the other matrix at said aligned positions.

13. The apparatus according to claim 1, wherein said apparatus is included in an aircraft for compactly storing and retrieving said movable devices.

14. The apparatus according to claim 1, wherein said plurality of article holders are stored in a pair of said matrices, each matrix including one of said longitudinal transfer assemblies, one of said transverse transfer assemblies, a said longitudinal drive, and a said transverse drive; and wherein one of said matrices includes a horizontally shiftable platform in one article holder position of one matrix and aligned with an article holder position in the other matrix to permit transfer of an article holder from one matrix to the other matrix at said aligned positions.

15. The apparatus according to claim 1, wherein said apparatus further includes a cleaning module of the same size and external configuration as one of said article holders, said cleaning module being insertable into said two-dimensional matrix in place of one of said article holders, said cleaning module including brushes for cleaning said apparatus with cleaning fluid.

16. The apparatus according to claim 15, wherein said cleaning module includes:

a housing having a horizontal line of rollers on each of its opposite sides for supporting the housing by suspension and for permitting its movement in the direction of the lines of horizontal rollers;

a cleaning fluid container within said housing for containing a cleaning fluid;

a feeding tube feeding cleaning fluid from said container to said brushes;

and a motor for rotating said brushes.

17. An aircraft for compactly storing and retrieving a plurality of movable article holders of the same size and external configuration each including opposed longitudinal sides and opposed transverse sides, comprising:

a support for horizontally supporting said plurality of article holders in the form of at least one two-dimensional matrix constituted of two columns and a plurality of rows of two article holders in each row, with each article holder in abutting relation with the adjacent article holders on its opposite longitudinal sides, and with a vacant space for one article holder in the first and last rows of the matrix;

two longitudinal transfer assemblies, one for each of said columns, each assembly including a pair of L-shaped retainer members engageable with the outer corners of the first article holder and the last article holder in the respective column;

two transverse transfer assemblies, one for the first row of the matrix and the other for the last row of the matrix, each transverse transfer assembly including a pair of L-shaped retainer members engageable with the outer corners of the article holder in the first row and the article holder in the last row, respectively;

a longitudinal drive for driving, in opposite longitudinal directions, said two longitudinal transfer assemblies and the article holders in their respective columns while the longitudinal sides of the article holders are maintained in said abutting relation by the pair of retainer members in each of the two longitudinal transfer assemblies;

a transverse drive for driving, in opposite transverse directions, said two transverse transfer assemblies and the article holders in their respective first and last rows while the longitudinal sides of the article holders in said first and last rows are maintained in abutting relation with the longitudinal sides of the article holders in the adjacent rows such that all said article holders are always secured against any movement other than that produced by said transfer assemblies;

and an electrical control system for controlling said longitudinal and transverse drives.

18. The aircraft according to claim 17, wherein said longitudinal drive comprises a common longitudinal drive motor for driving both of said longitudinal transfer assemblies simultaneously the same amount and in opposite longitudinal directions; and said transverse drive comprises a common transverse drive motor for driving both of said transverse transfer assemblies simultaneously the same amount and in opposite transverse directions.

19. The aircraft according to claim 17, wherein a substantial portion of the operation of the longitudinal drive for driving the longitudinal transfer assemblies occurs concurrently with the operation of the transverse drive for driving the transverse transfer assemblies, thereby minimizing the time required for a complete operational cycle.

20. The aircraft according to claim 17, wherein said article holders are received within carrier members supported in suspension by a line of rollers on each of the opposite transverse sides of each carrier member, said rollers being received within fixed longitudinally-extending tracks.

21. The aircraft according to claim 20, wherein said carrier members are supported for transverse movement over a horizontal floor by rollers carried by the carrier members and rollable along the horizontal floor.

22. The aircraft according to claim 20, wherein said article holders are supported for transverse movement over a horizontal floor by low-friction slide bars secured to the bottoms of the article holders and slidably engageable with underlying sections of the horizontal floor.

23. The aircraft according to claim 17, wherein said plurality of article holders are stored in a plurality of said matrices, each matrix including two of said longitudinal transfer assemblies, two of said transverse transfer assemblies, a said longitudinal drive, and a said transverse drive; and wherein said aircraft further includes a horizontally-shiftable platform in one article holder position in one matrix and aligned with an article holder position in the other matrix to permit transfer of an article holder from one matrix to the other matrix at said aligned positions.

24. The aircraft according to claim 17, wherein said horizontal support is a floor formed with an opening of slightly larger size than the size of one of said article holders; and said aircraft construction further comprises a lift assembly also controlled by said electrical control system and including a horizontal platform of the same size and configuration as said opening in the floor, and a vertical drive for driving said platform to a position flush with said floor to receive one of said article holders, or to another position vertically spaced from said floor to transfer the received article holder to another vertical level.

25. The aircraft according to claim 24, wherein said opening and said lift assembly are at an intermediate location in one of said columns.

26. The aircraft according to claim 24, wherein said opening and said lift assembly are at an end location in one of said columns.

27. The aircraft according to claim 24, wherein: said support for horizontally supporting said plurality of article holders, said transfer assemblies, and said lift assembly, are all included in a common cargo container loadable on, and unloadable from, the aircraft cargo hold; said common cargo container further including vertically-extending tracks of the lift assembly; and said aircraft including cooperable vertically-extending tracks having quick couplings for quickly coupling them to said vertically-extending tracks of the common cargo container.

28. The aircraft according to claim 24, wherein each of said article holders is capable of holding at least one article and includes a sildable latch which is closable to retain the article within the article holder.

29. The aircraft construction according to claim 28, wherein said lift assembly further includes a closable door and sensors permitting operation of the lift assembly only when the article holder received on said platform is completely full or empty, and said slidable latch is closed.

30. The aircraft according to claim 28,
wherein each article holder has a card holder for receiving at least one identification card for identifying the article to be received therein;
and wherein said control system further includes a control panel having an array of card holders for receiving an identification card for each of said article holders, and a sensor for each card holder for sensing the presence of an identification card in the respective card holder.

31. An aircraft for compactly storing and retrieving a plurality of movable article holders, comprising:
a support for movably supporting said plurality of article holders, each of said article holders being capable of holding at least one article;
a lift assembly for receiving an article holder and for transferring it to another vertical level to enable accessing and retrieving selected article holders;
a drive for driving said plurality of article holders and said lift assembly in order to permit the article holders to be selectively accessed;
and an electrical control system for controlling said drive;
said control system including a sensor on said lift assembly for sensing the content status of the article holder received on said lift assembly and for preventing operation of said drive if the article holder received on said lift assembly is not completely full or completely empty.

32. The aircraft according to claim 31,
wherein each article holder has a card holder for receiving at least one identification card identifying the article to be received therein;
and wherein said control system further includes a control panel having an array of card holders for receiving an identification card for each of said article holders, and a sensor for each card holder for sensing the presence of an identification card in the respective card holder and for controlling said drive.

33. The aircraft according to claim 31;

wherein said plurality of article holders are of the same size and external configuration each including opposed longitudinal sides and opposed transverse sides;

wherein said support horizontally supports said plurality of article holders in the form of at least one two-dimensional matrix constituted of two columns and a plurality of rows of two article holders in each row, with each article holder in abutting relation with the adjacent article holders on its opposite longitudinal sides, and with a vacant space for one article holder in the first and last rows of the matrix;

and wherein said drive for driving said plurality of article holders comprises:

two longitudinal transfer assemblies, one for each of said columns, each assembly including a pair of retainer members engageable with the outer longitudinal sides of the first and last article holders, respectively, in the respective column;

two transverse transfer assemblies, one for the first row of the matrix and the other for the last row of the matrix, each transverse transfer assembly including a pair of retainer members engageable with the opposed transverse sides of the article holder in the first row and in the last row, respectively;

a longitudinal drive for driving, in opposite longitudinal directions, said two longitudinal transfer assemblies and the article holders in their respective columns while the longitudinal sides of the article holders are maintained in said abutting relation by the pair of retainer members in each of the two longitudinal transfer assemblies;

a transverse drive for driving, in opposite transverse directions, said two transverse transfer assemblies and the article holders in their respective first and last rows while the longitudinal sides of the article holders in said first and last rows are maintained in abutting relation with the longitudinal sides of the article holders in the adjacent rows such that all said article holders are always secured against any movement other than those produced by said transfer assemblies;

and an electrical control system for controlling said longitudinal and transverse drives.

34. The aircraft according to claim 33, wherein said pair of retainer members in each of said two longitudinal transfer assemblies are each of L-shaped configuration for engagement with the outer corners of the first and the last article holder in the respective column;

and wherein said pair of retainer members in each of the two transverse transfer assemblies are also each of L-shaped configuration for engagement with the outer corners of the article holder in the first row and the article holder in the last row, respectively.

35. The aircraft according to claim 33, wherein said support is a floor formed with an opening of slightly larger size than the size of one of said article holders;

and wherein said aircraft further comprises a lift assembly including a horizontal platform of the same size and configuration as said opening in the floor, and a vertical drive for driving said platform to a position flush with said floor to receive one of said article holders, or to another position vertically spaced from said floor to transfer the received article holder to another vertical level.

36. The aircraft according to claim 33, wherein said plurality of article holders are stored in a plurality of said matrices, each matrix including two of said longitudinal transfer assemblies, two of said transverse transfer assemblies, a said longitudinal drive, and a said transverse drive; and wherein said aircraft further includes a horizontally shiftable platform in one article holder position of one matrix and aligned with an article holder position in the other matrix to permit transfer of an article holder from one matrix to the other matrix at said aligned positions.

37. A cleaning module for use in apparatus for compactly storing and retrieving a plurality of article holders, said cleaning module comprising:

a housing having a horizontal line of rollers on each of its opposite sides for supporting the housing by suspension and for permitting its movement in the direction of the lines of horizontal rollers;

a cleaning fluid container within said housing for containing a cleaning fluid;

a plurality of rotary brushes projecting from the lower end of said housing engageable with the surface to be cleaned;

a feeding tube feeding a cleaning fluid from said container to said brushes;

and a motor for rotating said brushes.

* * * * *